United States Patent [19]

Kurematsu et al.

[11] Patent Number: 4,782,347

[45] Date of Patent: Nov. 1, 1988

[54] RECORDING HEAD USING A PLURALITY OF INK STORING PORTIONS AND METHOD OF CARRYING OUT RECORDING WITH THE USE OF THE SAME

[75] Inventors: Katsumi Kurematsu, Kawasaki; Akihiro Mouri, Kokubunji; Shuzo Kaneko, Suginami; Tsutomu Toyono, Yokohama; Toshiya Yuasa, Mitaka, all of Japan

[73] Assignee: Canon Kabushiki Kaisha, Tokyo, Japan

[21] Appl. No.: 32,510

[22] Filed: Mar. 31, 1987

[30] Foreign Application Priority Data

| | | | |
|---|---|---|---|
| Apr. 2, 1986 | [JP] | Japan | 61-74293 |
| May 16, 1986 | [JP] | Japan | 61-110855 |
| May 16, 1986 | [JP] | Japan | 61-110856 |
| May 16, 1986 | [JP] | Japan | 61-110857 |
| May 16, 1986 | [JP] | Japan | 61-110858 |
| May 16, 1986 | [JP] | Japan | 61-110859 |
| May 16, 1986 | [JP] | Japan | 61-110860 |
| May 16, 1986 | [JP] | Japan | 61-110861 |

[51] Int. Cl.$^4$ .......................... G01D 15/18; B41J 3/12

[52] U.S. Cl. .............................. 346/1.1; 346/76 PH; 346/140 R; 400/126

[58] Field of Search ................... 346/140, 1.1, 76 PH; 400/120, 126

[56] References Cited

U.S. PATENT DOCUMENTS

| | | | |
|---|---|---|---|
| 3,655,379 | 4/1972 | Gundlach | 96/27 |
| 3,790,703 | 2/1974 | Carley | 346/140 X |
| 4,164,745 | 8/1979 | Cielo | 346/140 X |
| 4,550,324 | 10/1985 | Tamaru | 346/140 X |
| 4,561,789 | 12/1985 | Saito | 400/120 |

FOREIGN PATENT DOCUMENTS

| | | |
|---|---|---|
| 118493 | 7/1984 | Japan . |
| 225990 | 12/1984 | Japan . |
| 2387 | 1/1985 | Japan . |
| 4093 | 1/1985 | Japan . |
| 21297 | 2/1985 | Japan . |
| 46264 | 3/1985 | Japan . |
| 206677 | 10/1985 | Japan . |

OTHER PUBLICATIONS

Saito, et al., "Proposal of Thermal Rheography", National Convention Record, The Institute of Electronics & Communication Engineers of Japan, (paper 1295 w/translation), 3-(27/30)-1985, Yokohama, Japan.

Yamaguchi, et al., "Study of Recording Characteristics of Thermal Rheography", National Convention Record, The Institute of Electronics & Communication Engineers of Japan (paper 1296 w/translation), 3-(27/30)-1985, Yokohama, Japan.

*Primary Examiner*—Joseph W. Hartary

*Attorney, Agent, or Firm*—Fitzpatrick, Cella, Harper & Scinto

[57] ABSTRACT

A recording head comprises a housing for storing ink therein and a plurality of ink passage portions for allowing ink to pass from the housing to the exterior thereof. A plurality of heating elements are selectively heated so as to allow for the selective passage of ink through the plurality of ink passage portions. A spacer spaces apart the ink passage portions and a recording medium and also defines a temporary ink storing portion. In a recording method employing the recording head, the ink is heated by virtue of the heat of the heating elements, the ink having thus-reduced viscosity passing through the ink passage portions and transferred onto the recording medium, thereby obtaining a clearly recorded image.

36 Claims, 17 Drawing Sheets

RECORDING HEAD USING A PLURALITY OF INK STORING PORTIONS AND METHOD OF CARRYING OUT RECORDING WITH THE USE OF THE SAME

BACKGROUND OF THE INVENTION

1. Field of the Invention

The present invention relates to a recording head and a method of carrying out recording with the use of the same, both of which are suitable for use with image processors, electronic typewriters, facsimile machines, various kinds of display boards and the like.

2. Related Background Art

A heat sensitive transfer type recording method has been chiefly employed in the field of information processing in recent years. This recording method utilizes an inked film the substrate of which is coated with heat fusible ink, and comprises the steps of: heating the inked film in the form of an image pattern by means of a recording head; and transferring the thus-fused ink onto a recording medium such as copying paper. By utilizing the method, the size and weight of the apparatus employed can be reduced and recording can be effected on ordinary paper.

However, the aforementioned heat sensitive transfer type recording method involves problems in that, since an inked film which has been used only once must be thrown away, the running cost is high and the disposal of the used inked film becomes a nuisance.

In order to solve the above-described problem, it is well known that a recording head such as that shown, for example, in FIG. 1 is used to effect heat sensitive recording. In this method, a heating element 4 is disposed on a recording head indicated generally at 1, and the heating element 4 has an ink passage hole through which ink 3 is allowed to pass. This proposal has been disclosed, for example, in Japanese Patent Application Laid-open No. 118493/1984, Japanese Patent Application Laid-open No. 225990/1984, Japanese Patent Application Laid-open No. 4093/1985, Japanese Patent Application Laid-open No. 464262/1985 and Japanese Patent Application Laid-open No. 206677/1985.

In the case of a conventional type of recording head 1, when the heating element 4 is heated after a housing 2 has been charged with the semisolid ink 3, the ink 3 near the heating element 4 is softened and its viscosity is lowered, so that it may pass through the ink passage hole 5. Accordingly, if a plurality of the ink passage holes 5 are formed in the shape of an array and a signal is applied to the heating elements 4 associated with the respective ink passage holes 5 so that the elements 4 may be selectively heated, a desired ink image can be recorded on a recording sheet 9 in a transferred manner.

Since the aforesaid method needs no inked film, the running cost can be reduced. In addition, the method is advantageous in that, since the ink 3 can be directly heated without the need to interpose the film between the head 1 and the sheet 9, the efficiency of the thermal energy is superior.

In the above-described recording method, however, the ink passage hole 5 is disposed in contact with the recording sheet 9, and in this state the former is caused to slide over the latter. In consequence, there is a possibility of the thus-recorded image suffering from the phenomenon of ink tailing, ink overlapping or the like.

SUMMARY OF THE INVENTION

It is therefore an object of the present invention to provide a recording head which enables clear recording of images, and a method of carrying out recording with the use of such a recording head.

It is another object of the present invention to provide a recording head which enables image recording without any occurrence of the phenomenon of ink tailing, ink overlapping or the like, and a method of carrying out recording with the use of such a recording head.

It is another object of the present invention to provide a recording head having an improved ink repellency, and a method of carrying out recording with the use of such a recording head.

It is another object of the present invention to provide a recording head having an ink containing portion or portions, and a method of carrying out recording with the use of such a recording head.

It is a further object of the present invention to provide a recording head capable of recording images on a recording medium such as copying paper without the need to use a so-called inked film, and a method of carrying out recording with the use of such a recording head.

Further objects, features and advantages of the present invention will become apparent from the following description of preferred embodiments of the present invention with reference to the accompanying drawings.

DETAILED DESCRIPTION OF THE PREFERRED EMBODIMENTS

The preferred embodiments of the present invention will be described below with reference to the accompanying drawings.

The first preferred embodiment of a recording head which will be explained below in detail essentially comprises: a housing capable of storing ink therein; heating elements disposed on the housing and selectively heated in response to an image signal; a plurality of ink passage holes extending through the heating elements; and a plurality of discrete ink containing portions disposed over the heating elements, whereby recording is effected by means of the recording head.

The recording method used for the aforesaid first embodiment comprises the steps of: bringing the ink containing portions of the recording head into contact with a recording medium such as copying paper; causing both of them to move relative to each other; causing the heating elements to heat up in response to an image signal so as to reduce the viscosity of the ink stored in the ink containing portion; transferring the thus-softened ink onto the recording medium; and immediately supplying ink from the housing into the ink containing portions through the ink passage holes.

Therefore, the only ink stored in the ink containing portions is transferred onto the recording medium, and this substantially prevents the occurrence of various phenomena such as ink tailing.

Next, the above-mentioned first preferred embodiment will be described below in detail with reference to the accompanying drawings.

Figure 1:
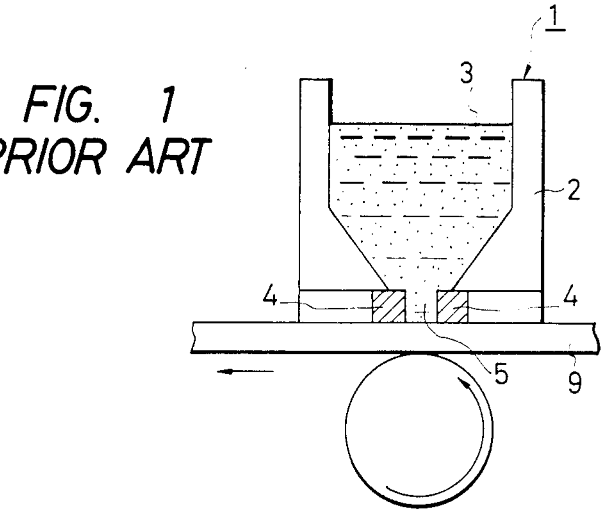
FIG. 1 PRIOR ART
FIG. 1 is a schematic illustration used as an aid in explaining the prior art.
Figure 2:
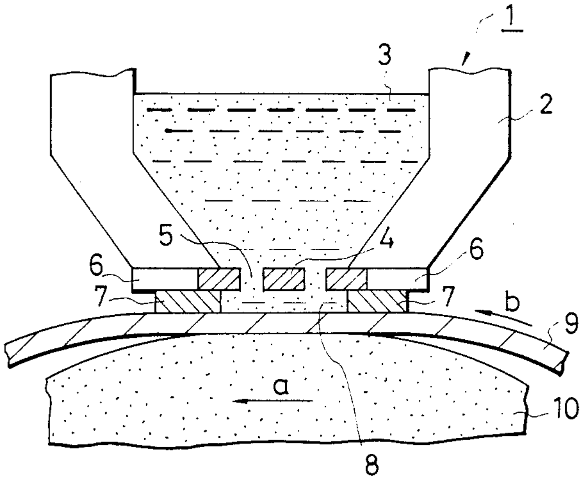
FIG. 2 is a schematic cross-sectional view of a first preferred embodiment of a recording head and its related portion in accordance with the present invention.
Figure 3:
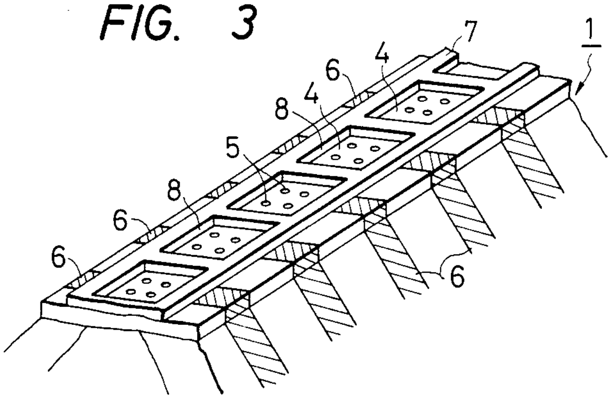
FIG. 3 is a schematic view of the external appearance of a multi type recording head to which the first embodiment is applied and which has a recording portion constructed in the form of a linear array.

FIG. 2 is a schematic cross-section of the first preferred embodiment of a recording head in accordance with the present invention, and FIG. 3 is a schematic view of the external appearance of a multi-type recording head to which the first embodiment is applied and which has a recording portion constructed in the form of a linear array.

Referring to FIGS. 2 and 3, a recording head indicated generally at 1 has a housing 2 for storing therein a so-called heat fusible ink 3 (including ink of the type which is softened or sublimated by heat). The heat fusible ink 3 maintains high viscosity in a semisolid form at a room temperature, but, as the temperature is elevated, the viscosity is lowered.

As shown in FIG. 2, a plurality of heating elements 4 composed of resistive carbon are provided at the portion of the housing 2. As shown more concretely in FIG. 3, the plurality of heating elements 4 are arranged in an array at a 1 mm pitch, and four ink passage holes 5 each having a diameter of 0.2 mm are so formed as to extend through the respective heating elements 4.

The respective heating elements 4 are connected to aluminum-made electrodes 6 capable of being energized in response to the image signal supplied from a control section (not shown). The heating elements 4 are arranged to individually generate heat when a given voltage is selectively applied to the electrodes 6 through the control section (not shown) in response to an image to be recorded.

Moreover, as shown in FIG. 3, a frame-shaped spacer 7 (hereinafter also referred to as a window) made of fluorine resin is disposed over the heating elements 4 in a continuously extending manner. The spacer 7 has a thickness of 0.05 mm, and has a frame-like shape in which a plurality of discrete ink containing portions 8 are arranged in an array on the heating elements 4, the size of each ink containing portion 8 being 0.8 mm×0.8 mm. Specifically, the spacer 7 has rectangular frames each surrounding a group of four ink passage holes 5.

When recording is to be effected by means of the aforesaid recording head 1, the spacer 7, as shown in FIG. 2, is brought into contact with a recording medium such as recording paper 9 and thus a predetermined image is recorded on the recording paper 9 while it is being conveyed by the rotation of a platen roller 10 in the direction of an arrow a.

Next, the case of recording an image by means of the recording head 1 will be described with reference to FIGS. 4A through 4D.

First, electric voltages are applied in a pulsed manner (24 V×20 ms) to the heating elements 4 through the electrodes 6. Thus, the heating elements 4 are caused to generate heat, thereby heating the semisolid ink 3 present in the vicinity of the heating elements 4. Since the ink 3 exhibits a high viscosity at room temperature, it does not pass through the ink passage holes 5 in this state. However, when the ink 3 is heated in the above-mentioned manner, the viscosity is lowered, thereby allowing the ink 3 to pass through the ink passage holes 5.

As the ink 3 passes through the ink passage holes 5 in the aforesaid manner, it spreads into the interiors of the ink containing portions 8. Since the ink 3 radiates heat during this time, it resumes a semisolid state or similar states. At this time, it is preferred that a static pressure higher than atmospheric pressure (for example, a gauge pressure of about 0.1 atmosphere) is applied to the interior of the housing 2 so as to accelerate passage of the ink 3 through the ink passage holes 5.

Figure 4A:
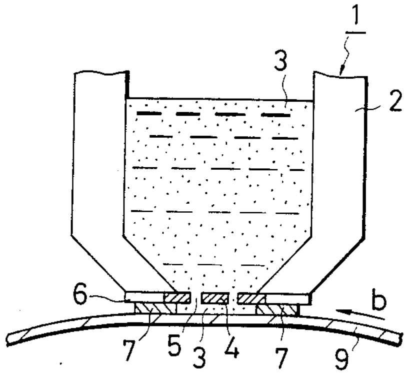
FIGS. 4A, 4B, 4C and 4D are respectively schematic illustrations used as an aid in explaining a recording process employing the recording head shown in FIG. 3.

Next, voltages are applied to the heating elements 4 in response to the image signal generated by the control section (not shown), thereby selectively heating the heating elements 4 (the state shown in FIG. 4A). The semisolid ink 3 present in the ink containing portions 8 adjacent to the selectively-heated elements 4 is reduced in viscosity, leaving the ink containing portions 8, and transferred onto the recording paper 9 which is being conveyed in the direction of an arrow b (the state shown in FIG. 4B). Subsequently, when the ink containing portions 8 become empty upon completion of the transfer, the ink 3 which has been reduced in viscosity by the heat generated by the heating elements 4 is supplied from the housing 2 through the ink passage holes 5 to the interior of the ink containing portion 8 (the state shown in FIG. 4C). As described previously, the ink 3 assumes a semisolid state owing to the heat which is radiated by the ink 3 while it is spreading into the ink containing portions 8 (the state shown in FIG. 4D).

The above-described process is repeated in response to an image signal until record dots corresponding to the respective sizes of the ink containing portions 8 are continuously formed on the recording paper 9, thereby achieving transfer of ink image.

The recording head 1 constituting the first preferred embodiment has the ink containing portions 8 the depth (0.05 mm) of which is smaller than the radius (0.1 mm) of each of the ink passage holes 5. Therefore, in a case where the heating elements 4 are heated, heat is transmitted to the ink 3 present in the ink containing portion 8 faster than in the ink passage holes 5. Accordingly, slightly prior to timing at which the ink 3 in the ink passage holes 5 is reduced in viscosity, passing through the same holes 5, the viscosity of the ink 3 present in the ink containing portions 8 is reduced, so that the ink 3 is transferred onto the recording paper 9.

Specifically, when a voltage equivalent to one pulse is applied to the heating elements 4, the ink 3 in the ink containing portions 8 is first transferred onto the recording paper 9. Immediately after the transfer, the ink 3 is supplied through the ink passage holes 5 to the ink containing portions 8 which have just been emptied.

In order to effect the recording depicted in the first preferred embodiment, it is preferred that the depth of the ink containing portion 8 is smaller than the radius of the associated ink passage holes 5. However, as a matter of course, the present invention is not confined solely to the aforesaid arrangement.

The following is a description of the ink 3 to be charged into the recording head 1. In general, heat fusible ink can be used as the ink 3. A typical heat fusible ink is prepared by dispersing or dissolving a coloring agent in a heat fusible binder, its properties such as melt viscosity and adhesion being suitably adjusted by adding elastomer or the like to the heat fusible binder.

The heat fusible binder may be composed of a single component or two or more components selected from the group consisting of various kinds of known binder such as natural and synthetic wax resins.

More specifically, the heat fusible binder constituting the ink 3 is selected from: the group consisting of natural wax such as whale wax, beeswax, lanolin, carnuba wax, candellilla wax, montan wax and ceresin wax; the group consisting of petroleum wax such as paraffin wax, microcrystalline wax; the group consisting of synthetic wax such as oxidized wax, ester wax, lower molecular polyethylene, Fischer-trophsch wax; the group consisting of higher fatty acid such as raulin acid, myrystic acid, palmitic acid, stearic acid, behenic acid; the group consisting of higher alcohol such as steryl alcohol, behenil alcohol; the group consisting of esters such as fatty acid ester of cane sugar, fatty acid ester of sorbitan; the group consisting of amides such as oleyl amide and the like; the group consisting of elastomers such as polyamide resin, polyester resin, epoxy resin, polyurethane resin, polyacrylic resin, polyvinyl chloride resin, cellulose resin, polyvinyl alcohol resin, petroleum resin, phenol resin, polystyrene resin, natural rubber, styrene butadiene rubber, ioprene rubber, chloroprene rubber; the group consisting of oily substances such as mineral oil and vegettable oil; and the group consisting of various plasticizers. The materials selected from the above noted groups are suitably combined, thereby controlling the melt temperature and melt viscosity of the heat fusible binder.

The coloring agent constituting the heat fusible ink 3 in combination with the heat fusible binder is selected from the groups consisting of dyeing materials and pigments such as carbon black which are generally used in printing or other recording methods. The dyeing materials and pigments may be used individually or in the form of a two or more component mixture. It is preferred that the content of the coloring agent is 1 to 40 percent by weight of the aforesaid ink 3.

Selection of the ink 3 is not confined solely to the kind that assumes a semisolid state at room temperature. For example, it is also possible to use either a paste-like material or a highly viscous material.

The first preferred embodiment described previously is arranged in such a manner that the only ink present in the ink containing portion 8 is transferred onto the recording paper 9, the ink being supplied to the ink containing portion 8 subsequently to the transfer. Transfer and recording of an image can be effected without involving the phenomenon of ink tailing or the like.

In the aforesaid embodiment, the depth of the ink containing portion 8 is made smaller than the radius of the associated ink passage holes 5 so as to establish a time lag between the conduction of heat to the ink in the ink containing portion 8 and that to the ink in the associated ink passage holes 5. However, the first embodiment is not limited to such an arrangement. For example, if adiabatic coats are respectively formed on the inner surfaces of the ink passage holes 5, it is possible to delay the conduction of heat to the ink in the ink passage holes with respect to that to the ink in the associated ink containing portion 8. In consequence, one application of a voltage equivalent to one pulse enables the same process as the aforesaid first embodiment.

Figure 4B:
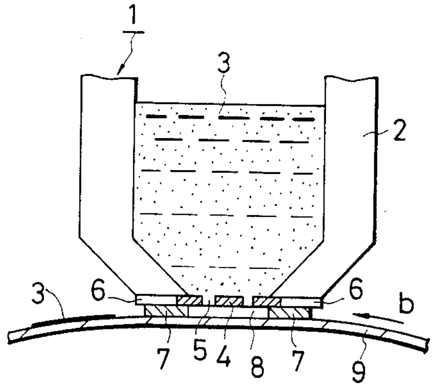
Figure 4C:
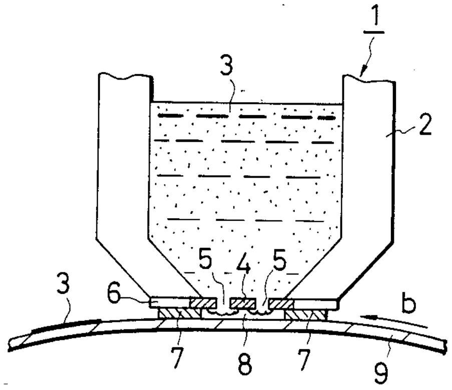
Figure 4D:
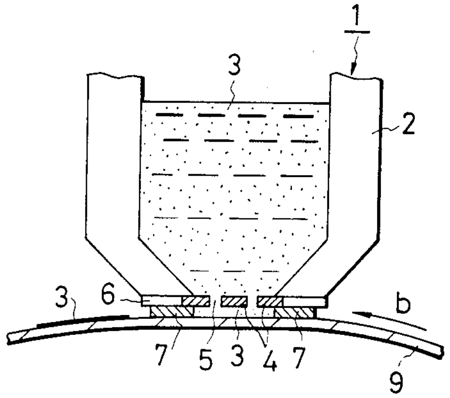

Also, the present invention may not be arranged in such a manner that, as described above, one application of a voltage equivalent to one pulse allows for printing of one dot. For example, as shown in FIGS. 4A and 4B, the ink 3 in the ink containing portions 8 is transferred onto the recording paper 9 in response to a first application of one pulse, and, as shown in FIGS. 4C and 4D, the ink 3 is newly supplied to the same ink containing portions 8 in response to a second application of one pulse. One cycle of pulse application is constituted by two applications of pulses, that is, the heating elements 4 could be heated twice, thereby completing printing of one dot.

In addition, the type of the recording head 1 is not limited to the aforesaid fixed type. For example, it may be arranged for rotation about its axis as shown in FIG. 5A.

Figure 5A:
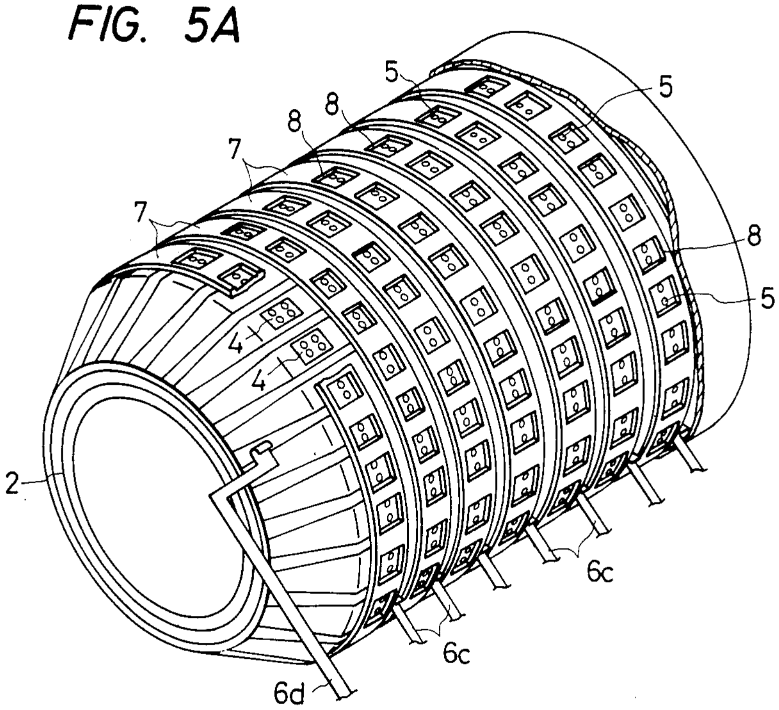
FIGS. 5A and 5B are respectively schematic illustrations used as an aid in explaining a rotary type recording head in accordance with the present invention.

The recording head shown in FIG. 5A is arranged in the following manner. The cylindrical housing 2 capable of storing the ink 3 in its interior is provided with a plurality of heating elements 4. The heating elements 4 are arranged in the longitudinal and circumferential directions of the outer surface of the cylindrical housing 2, and the spacers 7 are respectively placed on the heating elements 4, thereby constituting the ink containing portions 8.

Figure 5B:
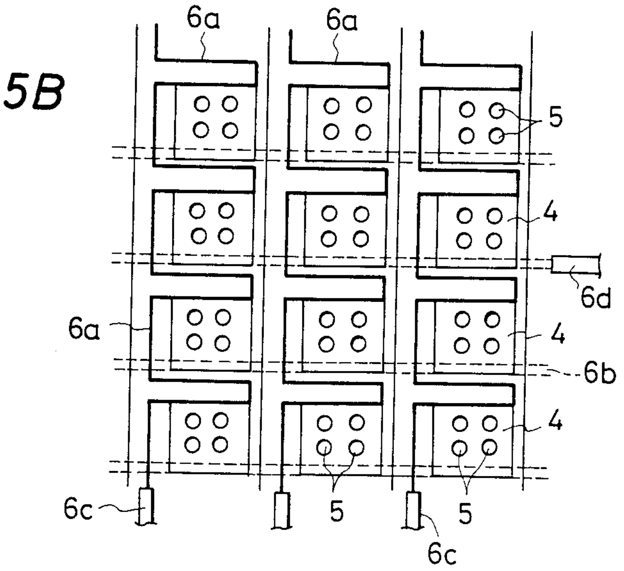

As shown in FIG. 5B, the respective heating elements 4 are connected to a signal electrode *6a* and a ground electrode *6b*. The respective electrodes *6a* and *6b* are arranged to come into contact with brushes *6c* and *6d*.

Therefore, when a pulsed voltage is applied to the brushes *6c* and *6d* in response to an image signal representative of an image to be recorded, the heating elements 4 along the electrode *6b* in contact with the grounding brush *6d* are selectively heated, thereby enabling transfer of the ink 3.

The recording head 1 is maintained in contact with recording paper, and is capable of being rotated in concurrence with the feed of the recording paper. Accordingly, it is possible to further efficiently prevent the phenomenon of ink tailing or ink overlapping.

In the above-described first embodiment, the respective heating elements 4 are composed of resistive carbon, but the use of carbon material is solely illustrative. It is possible to utilize any material that can be heated by the application of electricity. Instead of the above noted resistive carbon, for example, a substance such as tantalum nitride or ruthenium oxide may be deposited on a heat-resistant substrate made of ceramic, polyimide or other materials. The electrodes 6 could be composed of copper or an alloy including, for example, nickel, chrome or gold.

In addition, the level of the pulsed voltage applied to the heating elements 4 and the number of the ink passage holes 5 as well as the level of pressure applied to the ink 3 need not necessarily be limited to those of the aforesaid first embodiment. It is a matter of course that these features may be modified as required in accordance with the kinds of ink used, the sizes of the ink passage holes 5 and the ink containing portions 8 and other factors.

In the first embodiment, the recording medium 9 is made of paper. In addition, it is also possible to utilize a material having a surface made of fluororesin or silicon resin and relatively low wettability, which material is applied to the surface of a so-called "electronic black board (or copy board)" or a white board for writing on with a color marker pen. Also, while recording is being effected, the housing 2 may be moved with respect to the stationary recording medium. Furthermore, the first embodiment enables recording of an image such as characters, digits, figures and other various patterns.

The following description concerns a modification of the first embodiment and its examples.

The modification of the first embodiment of a recording head which will be explained below in detail essentially comprises: a housing capable of storing ink therein; heating elements disposed on the housing and selectively heated in response to an image signal; a plurality of ink passage holes extending through the heating elements; and a spacer disposed on the heating elements and including a plurality of discrete ink containing portions, the spacer being composed of a material having low wettability with respect to ink, whereby recording is effected by means of the thus-constructed recording head.

The modification is characterized in that, since the spacer is made of a material having low wettability with respect to ink, the spacer has a superior water and oil repellency and hence improved ink repellency.

The modification and its examples will be described more concretely with specific reference to FIGS. 2 to 4D.

As shown in FIG. 3, the frame shape spacer 7 is disposed on the heating elements 4. The spacer 7 is composed of a material having low wettability with respect to ink. Fluorine resin is known as such a material, and in particular its critical surface tension is preferably 8 dyn/cm to 31 dyn/cm; more preferably 8 dyn/cm to 31 dyn/cm; and most preferably 10 dyn/cm to 20 dyn/cm. The spacer 7 made of the aforesaid material is disposed over the heating elements 4 in such a manner as to extend in the form of an elongated frame. The spacer 7 has a plurality of rectangular ink containing portions 8 which are discretely defined and arranged in an array throughout the length of the frame. The ink transferred from the ink containing portions 8 forms the dots of a recorded image. However, the configuration of the ink containing portions 8 is not necessarily limited to the aforesaid rectangular one. As a further example, they may be formed into a circular shape in accordance with the arrangement of the dots that forms a recorded image.

Accordingly, when a voltage is applied to the heating elements 4 in response to an image signal, the heating elements 4 are selectively heated (the state shown in FIG. 4A). The thus-generated heat causes reduction in the viscosity of the semisolid ink 3 present in the ink containing portion 8. Thus, the ink 3 leaves the ink containing portion 8, and is then transferred onto the recording paper 9 which is being conveyed in the direction of the arrow b (the state shown in FIG. 4B). Since the spacer 7 is composed of a material having low wettability with respect to the ink 3, the ink can be easily removed from the surface of the spacer 7.

The fluorine resin forming the spacer 7 may be selected from the group consisting of, for example, polytetrafluoroethylene (Teflon), polychlorotrifluoroethylene, polytrifluoroethylene, polyvinylidene fluoride, polyvinyl fluoride and the like.

The following is a description of the results of experiments conducted with the above-described arrangement.

EXAMPLE 1

A recorded image was obtained by the use of the recording head 1 shown in FIGS. 2 and 3 under the following conditions.

The heating elements 4 made of resistive carbon were formed on the housing 2, and, as shown in FIG. 2, the heating elements 4 were arranged in an array at a 1 mm pitch. Then, four ink passage holes 5 were formed in each of the heating elements 4, the respective ink passage holes 5 being constituted by through-holes having a diameter of 0.2 mm.

The aluminium-made electrodes 6 were then connected to the respective heating elements 4, and the frame-shaped spacer 7 was formed over the heating elements 4, the spacer 7 being composed of polytetrafluoroethylene (Teflon; critical surface tension: 18 dyn/cm).

The thickness of the spacer 7 was 0.05 mm, and the rectangular ink containing portions 8 each measuring 0.8 mm×0.8 mm were arranged in an array throughout the length of the spacer 7.

A pulsed voltage of 24 V×20 ms was applied to the electrodes 6, and a static pressure equivalent to a gauge pressure of about 0.1 atmospheres was applied to the interior of the housing 2 so as to accelerate passage of the ink 3 through the ink passage holes 5.

The ink 3 was prepared in the following manner. The components listed below were weighted out in parts by weight, mixed together, and charged with 1.5-$\phi$ glass beads into a one-cylinder sand mill which was maintained at 140° C. These components were dispersed and mixed together at 2000 rmp for thirty minutes. After separating the beads from the thus-obtained mixture, the mixture was subjected to cooling and a heat fusible semisolid ink was prepared.

| | |
|---|---|
| Ester Wax | 40 weight parts |
| Liquid Paraffim | 40 weight parts |
| Fatty Acid Modified Silicon Oil | 25 weight parts |
| Carbon Black | 5 weight parts |
| Dispersing Agent | 5 weight parts |

An image was transferred onto the recording paper 9 by the use of the semisolid ink under the aforesaid conditions.

The thus-obtained image was clearly recorded in response to a pulsed voltage, and neither ink tailing nor ink overlapping was to be found.

In addition, it was found that the spacer 7 of the recording head was neither deformed nor softened by heat and ink repellency was improved.

EXAMPLE 2

The spacer 7 was in this case composed of polyvinylidene fluoride (critical surface tension: 25 dyn/cm). Apart from the composition of the spacer 7, transfer was effected on the recording paper 9 under the same conditions as those used in Example 1.

The thus-obtained image was clearly recorded in response to a pulsed voltage, and neither ink tailing nor ink overlapping was to be found. The quality of the recorded image was as high as that of Example 1 and the ink repellency of the spacer 7 was improved.

EXAMPLE 3

The spacer 7 was in this case composed of polychlorotrifluoroethylene (critical surface tension: 31 dyn/cm). Apart from the composition of the spacer 7, transfer was effected on the recording paper 9 under the same conditions as those used in Example 1.

The thus-obtained image was clearly recorded in response to a pulsed voltage, and neither ink tailing nor ink overlapping was to be found. The quality of the recorded image was as high as that of Example 1 and the ink repellency of the spacer 7 was improved.

The foregoing results confirmed that, if the spacer 7 that forms the ink containing portions 8 is composed of fluorine resin having a critical surface tension of 31 dyn/cm, it becomes possible to obtain a clearly recorded image with a reduced degree of ink tailing, ink overlapping or the like.

The second preferred embodiment of the present invention will be described below with reference to FIGS. 6A to 10B. In the respective embodiments which will be described below, like reference numerals are used for the sake of simplicity to denote like or corresponding elements which perform functions similar to that of the aforesaid first embodiment. For this reason, the portion of the above description that is common to this embodiment is incorporated for reference purposes and only those points which are different will be described below in detail.

The second preferred embodiment of a recording head which will be explained below essentially comprises: a housing capable of storing ink therein; heating elements disposed over the housing and selectively heated in response to an image signal; a plurality of ink passage holes extending through the heating elements; and a window disposed over the heating elements and including a plurality of discrete ink containing portions, ink passage holes being partially formed in the respective ink containing portions, so that recording is effected by the thus-obtained recording head.

A recording method used for the aforesaid second embodiment comprises the steps of: bringing a portion of the window of the recording head into contact with a recording medium such as copying paper; causing both of them to move relative to each other; causing the heating elements to heat up in response to an image signal so as to reduce the viscosity of the ink stored in the ink containing portions; transferring the thus-softened ink onto the recording medium; and immediately supplying ink from the housing into the ink containing portions through the ink passage holes. During this time, the ink which has its viscosity reduced in the ink containing portions is allowed to pass through the ink passage holes formed in the window, and is transferred onto the recording medium. Therefore, the only ink stored in the ink containing portions is positively transferred onto the recording medium without involving the occurrence of such phenomena as ink tailing.

Next, the above-mentioned second preferred embodiment will be described below in detail.

Figure 6A:
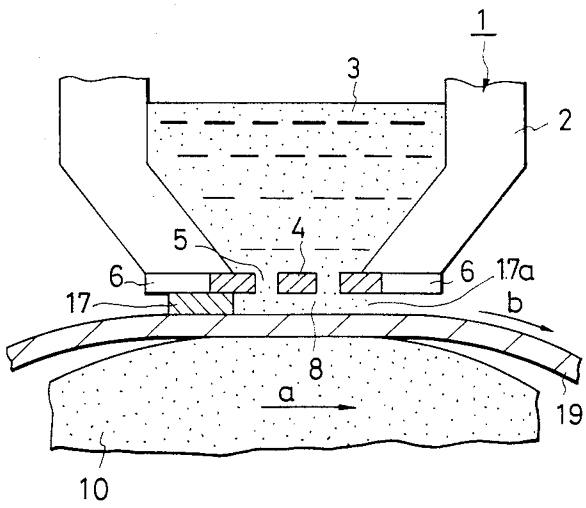
FIG. 6A is a schematic cross-sectional view of a second preferred embodiment of a recording head and its related portion in accordance with the present invention.
Figure 6B:
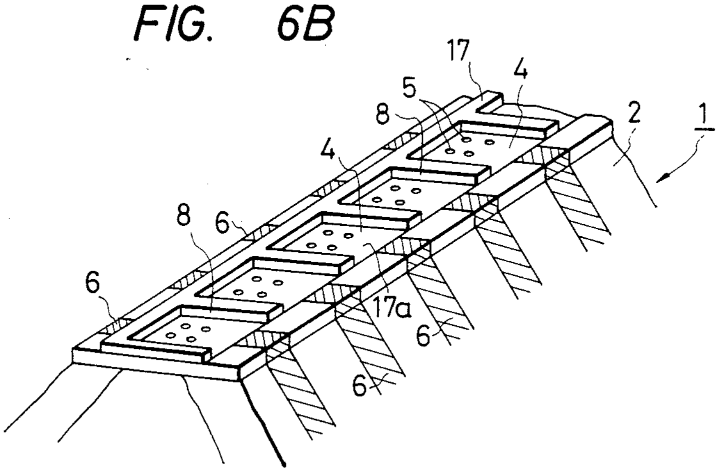
FIG. 6B is a schematic view of the external appearance of a multi-type recording head to which the second embodiment is applied and which has a recording portion constructed in the form of a linear array.

FIG. 6A is a schematic cross-section of a recording head constituting the second preferred embodiment of the present invention, and FIG. 6B is a schematic view of the external appearance of a multi-type recording head to which the second embodiment is applied and which has a recording portion constructed in the form of a linear array.

As shown in FIGS. 6A and 6B, a frame-shaped window 17 made of fluorine resin is disposed over the heating elements 4 in a continuously extending manner. The window 17 has a thickness of 0.05 mm, and has a frame-like shape in which a plurality of the discrete ink containing portions 8 are arranged in an array over the heating elements 4, the size of each ink containing portion 8 being 0.8 mm×0.8 mm. The window 17 is provided with cutouts 17*a*, and each section of the window 17 is formed in the shape of an angular C, so that the window 17 as a whole has a comb-like shape. The cutouts 17*a* constitute ink passage portions.

It is preferred that the window 17 is made of an abrasion resistant material, and in addition to fluorine resin, the material could be selected from the group consisting of inorganic materials such as alumina, glass and copper or the group consisting of heat resistant resins such as polyimide and polyamide imide.

When recording is to be effected by means of the recording head 1, the window is maintained, as shown in FIG. 6A, inssuch a manner that the ink passage portions (cutouts 17*a*) are positioned downstream of the recording paper 9 as viewed in the direction of travel thereof. In this state, the window is maintained in contact with the recording paper 9, so that a predetermined image is recorded on the recording paper 9 while it is being conveyed by the rotation of a platen roller 10 in the direction of the arrow a.

Next, the case of recording an image by means of the recording head 1 will be described with reference to FIGS. 7A through 7D.

First, electric voltages are applied in appulsed manner (24 V×20 ms) to the heating elements 4 through the electrodes 6. Thus, the heating elements 4 are caused to generate heat, thereby heating the semisolid ink 3 present in the vicinity of the heating elements 4. Since the ink 3 exhibits a high viscosity at room temperature, it does not pass through the ink passage holes 5. However, when the ink 3 is heated in the above-mentioned manner, the viscosity is lowered. This allows the ink 3 to pass through the ink passage holes 5.

As the ink 3 passes through the ink passage holes 5 in the aforesaid manner, it spreads into the interiors of the ink containing portions 8. Since the ink 3 radiates heat during this time, it resumes a semisolid state or similar states. At this time, it is preferable that a static pressure higher than atmospheric pressure (for example, a gauge pressure of about 0.1 atmospheres) is applied to the interior of the housing 2 so as to accelerate passage of the ink 3 through the ink passage holes 5.

Figure 7A:
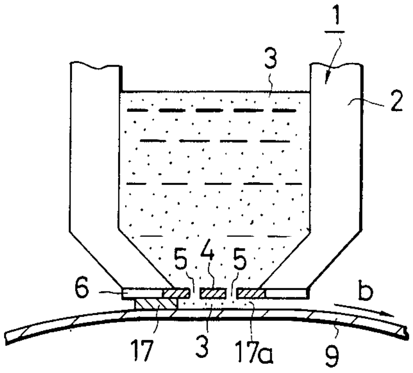
FIGS. 7A, 7B, 7C and 7D are rspectively schematic illustrations used as an aid in explaining a recording process employing the recording head shown in FIG. 6B.
Figure 7B:
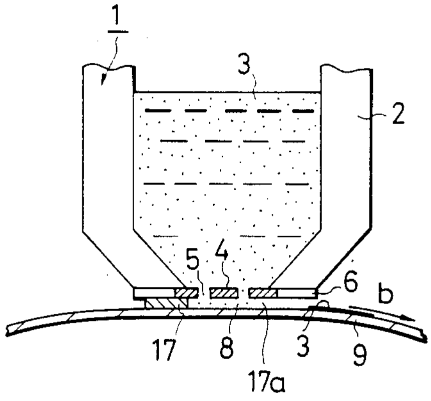

Next, voltages are applied to the heating elements 4 in response to an image signal, thereby selectively heating the heating elements 4 (the state shown in FIG. 7A). The semisolid ink 3 present in the ink containing portions 8 adjacent to the selectivelyheated elements 4 is reduced in viscosity, leaving the ink containing portions 8, and transferred onto the recording paper 9 which is being conveyed in the direction of an arrow b (the state shown in FIG. 7B). As described above, the recording paper 9 on which the ink 3 has been transferred is allowed to travel in the direction of the arrow b. However, since the window 7 has the ink passage portions constituted by the cut-outs 17*a* on the downstream side as viewed in the direction of travel of the thus-transferred ink, the window 7 never comes into contact with the transferred ink. It is therefore possible to prevent the occurrence of ink trailing.

Figure 7C:
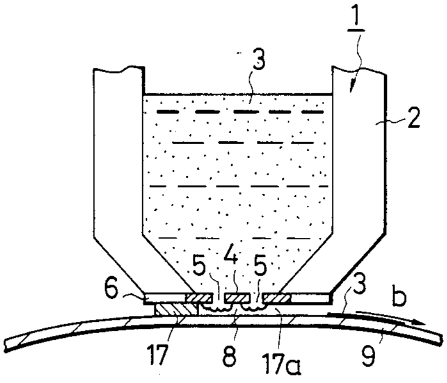
Figure 7D:
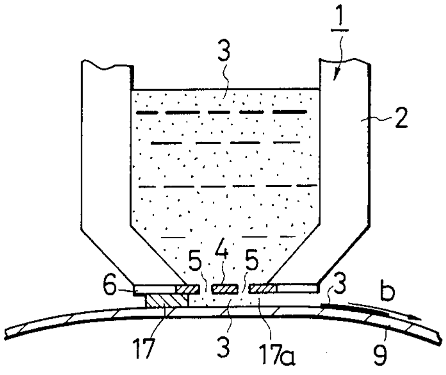

Subsequently, when the ink containing portions 8 become empty upon completion of the transfer, the ink 3 which has been reduced in viscosity by the heat generated by the heating elements 4 is supplied from the housing 2 through the ink passage holes 5 to the interiors of the ink containing portions 8 (the state shown in FIG. 7C). As described previously, the ink 3 assumes a semisolid state owing to the heat which is radiated by the ink 3 while it is spreading into the ink containing portions 8 (the state shown in FIG. 7D).

The above-described process is repeated in response to an image signal until record dots corresponding to the respective sizes of the ink containing portions 8 are continuously formed on the recording paper 9, thereby accomplishing transfer of ink image.

The second preferred embodiment described previously is arranged in such a manner that the only ink present in the ink containing portions 8 is transferred onto the recording paper 9, the ink being supplied to the ink containing portions 8 subsequently to the transfer. The thus-transferred ink is not brought into contact with the window 17 and this enables transfer and recording of an image to be effected without involving the phenomenon of ink trailing or the like.

In the aforementioned second embodiment, the ink containing portions formed by the window 17 has a rectangular shape as shown in FIG. 6B, but this is merely an illustrative form. As an example, they could be formed in a circular shape or any other suitable shape.

Figure 8A:
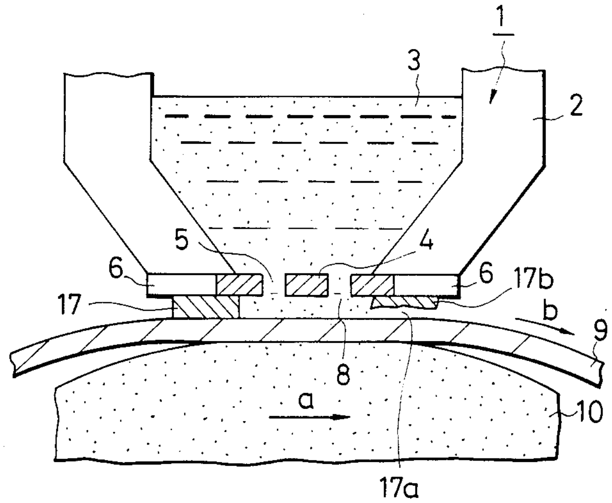
FIGS. 8A, 8B, 9A, 9B, 10A, 10B are respectively schematic illustrations used as an aid in explaining modifications of the recording head and their recording processes in accordance with the present invention.
Figure 8B:
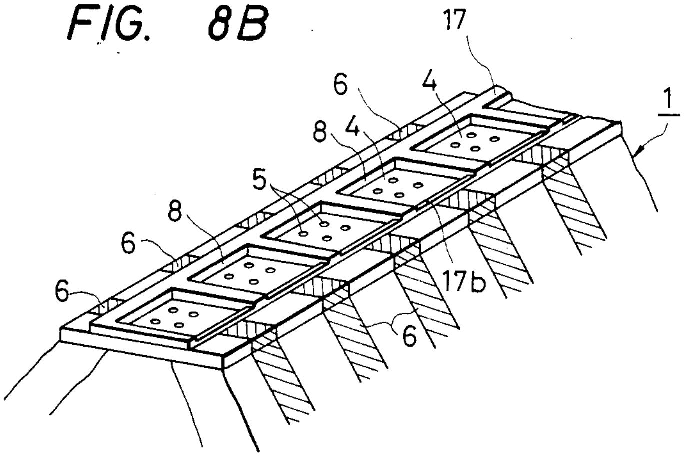
Figure 9A:
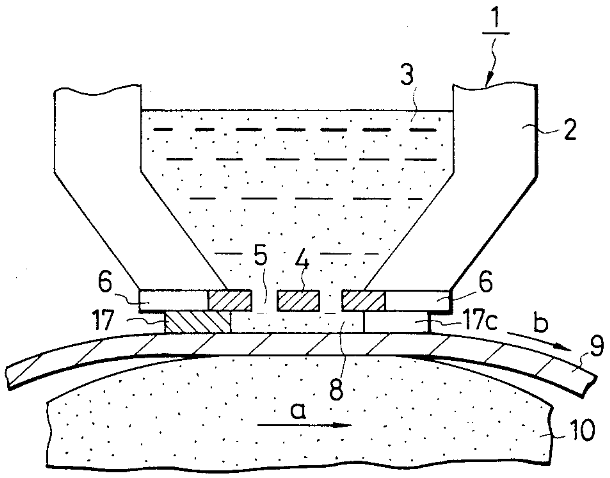
Figure 9B:
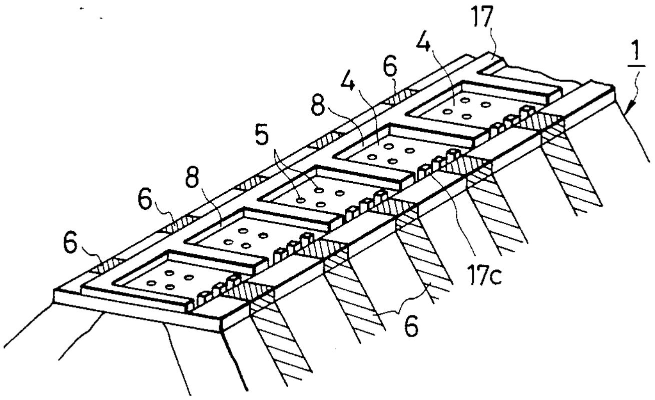

Also, in the second embodiment, the ink passage portions are constituted by the cutouts 17*a* of the window 17. However, as shown in FIGS. 8A and 8B, the window 17 may be provided with thin-walled portions indicated generally at 17*b* which are thinner than the remaining portion, and the thin-walled portions 17*b* could be used as the aforesaid ink passage portions 17*a*. In this arrangement, when the window 17 is brought into contact with the recording paper 9 in the same manner as in the case of FIG. 6A, the ink passage portions 17*a* (or thin-walled portions 17*b*) do not come into contact with the recording paper 9. In consequence, while the recording paper 9 is being conveyed in the direction of the arrow b, the ink transferred onto the recording paper 9 is never made to trail by the window 17.

Figure 10A:
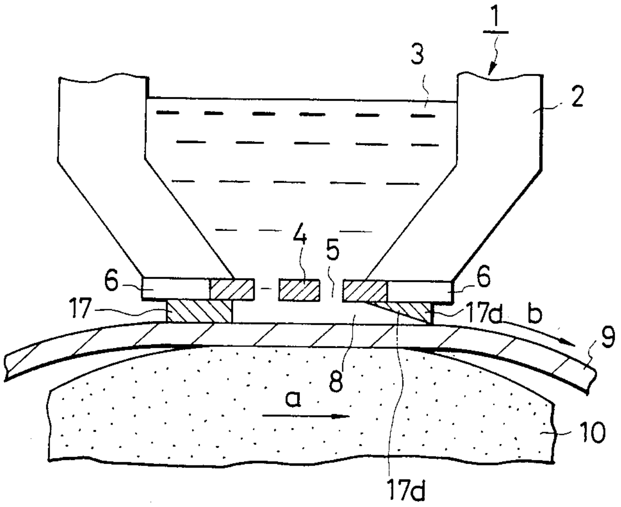
Figure 10B:
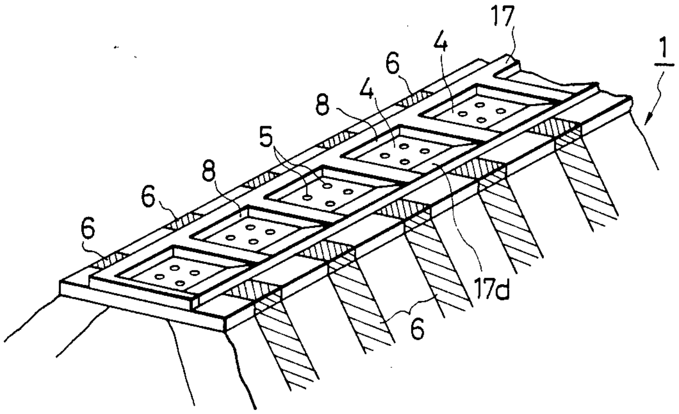

In addition, the aforesaid ink passage portions may be formed as shown in FIGS. 10A and 10B. As clearly shown in FIG. 10B, the window 17 has slopes indicated generally at 17*d*, the respective slopes progressively rising from the interior of the associated ink containing portions toward the exterior of the same. In a case where the recording paper 9 is made to travel in contact with the window in the direction of the arrow b, this arrangement allows the ink transferred onto the recording paper 9 to travel in contact with the slopes 17*d* thereby enabling smooth movement of the recording paper 9 and the associated window 17. In consequence, the aforesaid ink is never made to trail by the window 17. It will be appreciated that, the same effect can be achieved by forming the respective slopes with a curved surface as well as a flat surface.

As is evident from the foregoing, according to the second preferred embodiment, the only ink present in the ink containing portions 8 is transferred onto the recording medium 9, and in addition the window 17 has the ink passage portions 17*a* so as to prevent the occurrence of ink trailing owing to the presence of the window 15 in itself. In consequence, it is possible to reduce the percentage of occurrence of ink trailing, ink overlapping or the like on the transferred image, thereby enabling clear recording of images.

The third preferred embodiment of the present invention will be described below with reference to FIGS. 11 to 14.

The third preferred embodiment which will be explained below in detail essentially comprises: a housing capable of storing ink therein; porous heating elements disposed on the housing and selectively heated in response to an image signal; and a plurality of discrete ink containing portions defined over the heating elements, whereby recording is effected by meas of the thus-constructed recording head.

A recording method used for the aforesaid third embodiment comprises the steps of: bringing the ink containing portions of the recording head into contact with a recording medium such as copying paper; causing both of them to move relative to each other while making the heating elements to generate head in response to an image signal so as to reduce the viscosity of the ink stored in the ink containing portions; transferring the thus-softened ink onto the recording medium; and immediately supplying ink from the housing into the ink containing portions through associated pores formed in the porous heating elements.

Therefore, the only ink stored in the ink containing portions is transferred onto the recording medium, and this substantially prevents the occurrence of various phenomena such as ink tailing and the like.

Next, the above-mentioned third preferred embodiment will be described below in detail.

Figure 11:
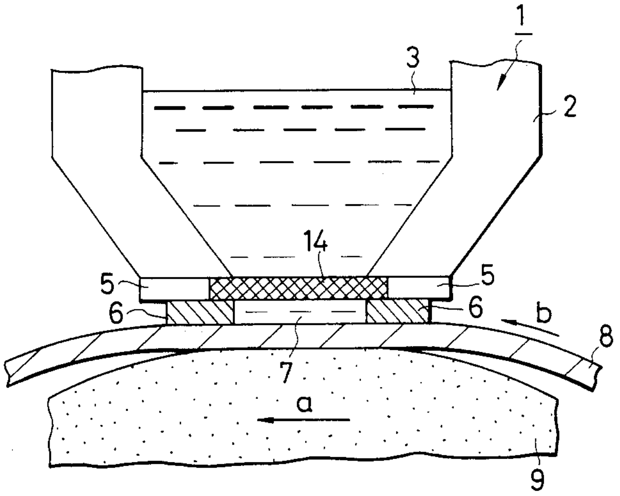
FIG. 11 is a cross-sectional view of a third preferred embodiment of a recording head and its related portion in accordance with the present invention.
Figure 12:
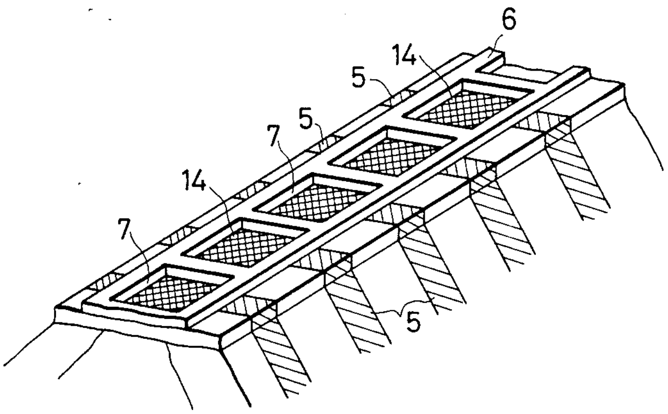
FIG. 12 is a schematic view of the external appearance of a multi-type recording head to which the third embodiment is applied and which has a recording portion constructed in the form of a linear array.

FIG. 11 is a schematic cross-section of the third preferred embodiment of a recording head in accordance with the present invention, and FIG. 12 is a schematic view of the external appearance of a multi-type recording head to which the third embodiment is applied and which has a recording portion constructed in the form of a linear array.

Referring to FIGS. 11 and 12, the recording head indicated generally at 1 has the housing 2 for storing therein the so-called heat fusible ink 3 (including ink of the type which is softened or sublimated by heat). The heat fusible ink 3 maintains high viscosity in a semisolid form at room temperature, but as the temperature is elevated, the viscosity is lowered.

A plurality of porous heating elements 14 are partially formed on the housing 2, the respective elements 14 being composed of carbon black having a sheet resistance of 200 and polyethylene tetrafluoride. The thickness is 100 μm, the average pore diameter being 5 μm, and the porosity being 50%. The porous heating elements 14 are arranged in an array at a 1 mm pitch as shown in FIG. 12.

The respective heating elements 14 are connected to golden electrodes 5 capable of being energized in response to an image signal. The heating elements 14 are arranged to individually generate heat by selectively applying voltages to the electrodes 5.

Next, the case of recording an image by means of the above-described recording head 1 will be described with eference to FIGS. 13A through 13D.

First, electric voltages are applied in a pulsed manner (24 V×20 ms) to the porous heating elements 14 through the electrodes 5. Thus, the heating elements 14 are caused to generate heat, thereby heating the semisolid ink 3 present in the vicinity of the heating elements 14. Since the ink 3 exhibits a high viscosity at room temperature, it does not pass through the porous structure of the porous heating elements 14. However, when the ink 3 is heated in the above-mentioned manner, the viscosity is lowered, thereby allowing the ink 3 to pass through the porous structure.

As the ink 3 passes through the porous heating elements 14 in the aforesaid manner, it spreads into the interiors of the ink containing portions 7. Since the ink 3 radiates heat during this time, it resumes a semisolid state or other states close thereto. At this time, it is preferable that a static pressure higher than atmospheric pressure (for example, a gauge pressure of about 0.1 atmospheres) is applied to the interior of the housing 2 so as to accelerate passage of the ink 3 through the porous heating elements 14.

Figure 13A:
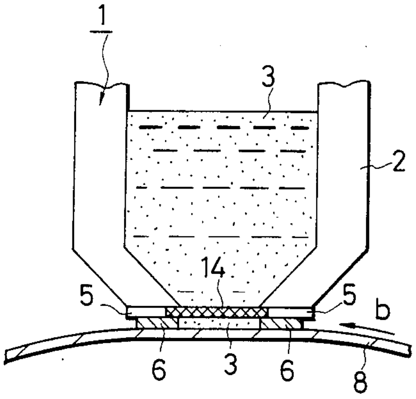
FIGS. 13A, 13B, 13C and 13D are respectively schematic illustrations used as an aid in explaining a recording process employing the recording head shown in FIG. 12.
Figure 13B:
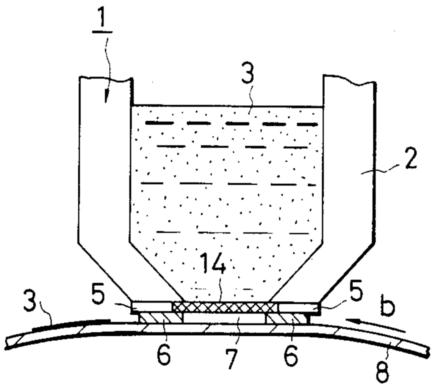
Figure 13C:
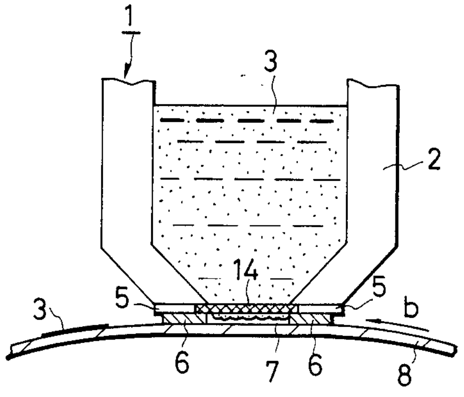
Figure 13D:
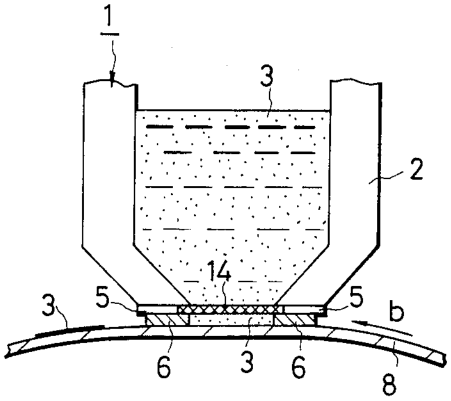

Next, voltages are applied to the porous heating elements 14 in response to an image signal, thereby selectively heating the heating elements 14 (the state shown in FIG. 13A). The semisolid ink 3 present in the ink containing portions 7 adjacent to the selectively-heated elements 14 is reduced in viscosity, leaving the ink containing portions 7, and transferred onto the recording paper 8 which is being conveyed in the direction of an arrow b (the state shown in FIG. 13B). Subsequently, when the ink containing portions 7 become empty upon completion of the transfer, the ink 3 which has been reduced in viscosity by the heat generated by the heating elements 14 is supplied from the housing 2 through the porous structure of the heating elements 14 to the interiors of the ink containing portion 7 (the state shown in FIG. 13C). As described previously, the ink 3 reassumes a semisolid state owing to the heat which is radiated by the ink 3 while it is spreading in the ink containing portions 7 (the state shown in FIG. 13D).

The above-described process is repeated in response to an image signal to be recorded until record dots corresponding to the respective sizes of the ink containing portions 7 are continuously formed on the recording paper 8, thereby achieving transfer of an ink image.

In the aforesaid process, while the ink 3 is being supplied to the interior of the ink containing portions 7, a drive is formed in the ink 3 passing through the porous structure of the heating elements 14. Therefore, slightly prior to the time at which the ink having its viscosity reduced passes through the porous structure of the heating elements 14, the ink 3 in the ink containing portions 7 are reduced in viscosity, transferred onto the recording paper 8.

Specifically, when a voltage equivalent to one pulse is applied to the heating elements 14, the ink 3 in the ink containing portions 7 is first transferred onto the recording paper 8. Immediately after the transfer, the ink 3 is supplied through the porous structure of the heating elements 14 to the ink containing portions 7 which have just been emptied.

In addition, the type of the recording head 1 is not limited to the aforesaid fixed type. For example, it may be arranged for rotation about its axis as shown in FIG. 14A.

Figure 14A:
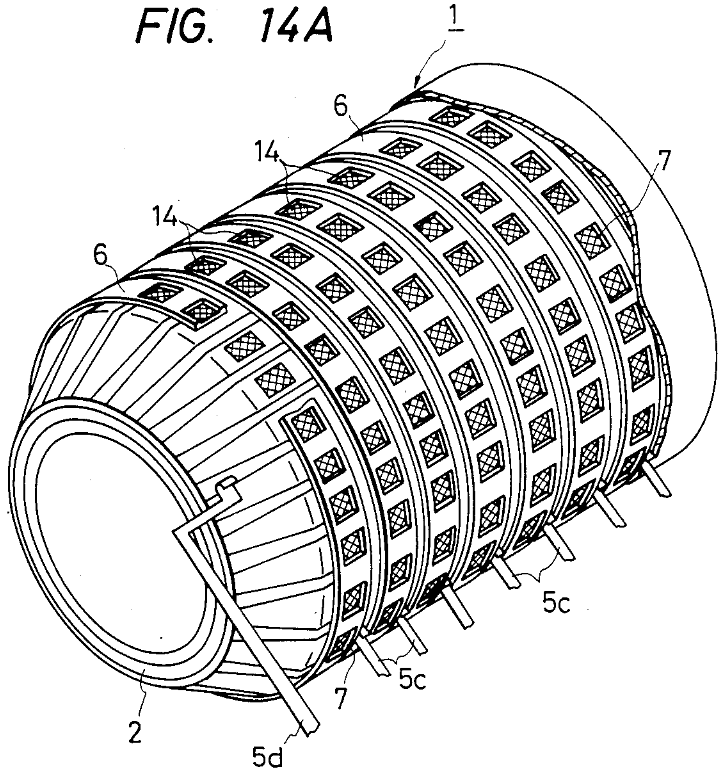
FIGS. 14A and 14B are respectively schematic illustrations used as an aid in explaining a rotary type recording head in accordance with the present invention.

The recording head shown in FIG. 14A is arranged in the following manner. The cylindrical housing 2 capable of storing the ink 3 in its interior is provided with a plurality of porous heating elements 14. The heating elements 14 are arranged in the longitudinal and circumferential directions of the outer surface of the cylindrical housing 2, and the window 6 is disposed over the heating elements 14, thereby constituting the ink containing portions 7.

Figure 14B:
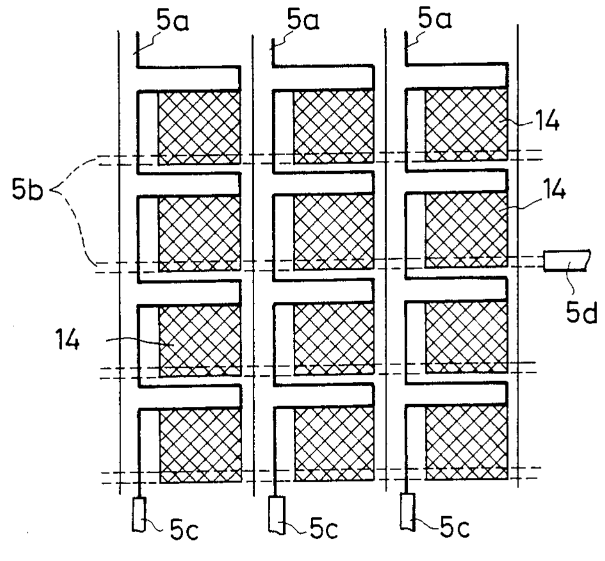

As shown in FIG. 14B, the respective heating elements 14 are connected to a signal electrode **5*a* and a grounding electrode 5*b*. The respective electrodes 5*a* and 5*b* are arranged to come into contact with brushes 5*c* and 5*d***.

Therefore, when pulsed voltage are applied to the brushes **5*c* and 5*d* in response to an image signal representative of an image to be recorded, the heating elements 14 along the electrode 5*b*** in contact with the grounding brush 5*d* are selectively heated, thereby enabling transfer of the ink 3.

The recording head 1 is maintained in contact with recording paper, and is capable of being rotated in concurrence with the feed of the recording paper. Accordingly, it is possible to further efficiently present the phenomenon of ink trailing or ink overlapping.

In the aforesaid embodiment, a porous body including carbon and polyethylene tetrafluoride is used for the heating elements 14, but the use of carbon material is solely illustrative. It is possible to utilize any material that can be heated by the application of electricity to thereby allow the ink to pass through the porous structure thereof. Instead of the above noted material, for example, substances such as tantalum nitride or ruthenium oxide may be deposited in a mesh-like manner on a heat-resistant porous substrate made of ceramic, polyimide or other materials. In addition to gold, the electrodes 5 could be composed of copper or an alloy including, for example, nickel, chrome or aluminium. Moreover, the level of the pulsed voltage applied to the heating elements 14 and the porosity of the porous structure of the heating elements 14 as well as the level of pressure applied to the ink 3 need not necessarily be limited to those of the aforesaid embodiment. It is a matter of course that these features may be modified as required in accordance with the kinds of ink used, the sizes of the ink passage holes 5 and the ink containing portions 7 and other factors.

As is evident from the foregoing, in the third embodiment, the only ink present in the ink containing portions 7 is transferred on the recording medium. Therefore, this substantially prevents the occurrence of ink trailing, ink overlapping and the like on the transferred image, so that clear recording of an image is achieved.

The fourth preferred embodiment of the present invention will be described below with reference to FIGS. 15 to 18.

The fourth preferred embodiment which will be explained below essentially comprises: a housing capable of storing ink therein; ink transfer heating elements and ink supply heating elements, both elements being selectively heated in response to an image signal a plurality of discrete ink passage holes formed in the heating elements; and ink passage holes providing communication between the ink containing portions and the housing, so that recording is effected by the thus-obtained recording head.

A recording method used for the aforesaid fourth embodiment comprises the steps of: bringing the ink containing portions of the recording head into contact with a recording medium such as copying paper; causing both of them to move relative to each other while the heating elements are being heated up in response to an image signal so as to reduce the viscosity of the ink stored in the ink containing portions; transferring the thus-softened ink onto the recording medium; promptly thereafter or simultaneously therewith causing the supply heating electrodes to generate heat so as to supply the ink from the housing to the interior of the ink containing portions through the ink passage holes.

Therefore, the only ink stored in the ink containing portions is positively transferred onto the recording medium without involving the occurrence of such phenomena as ink trailing.

The fourth preferred embodiment incorporating the aforesaid recording means will be described below in detail.

Figure 15:
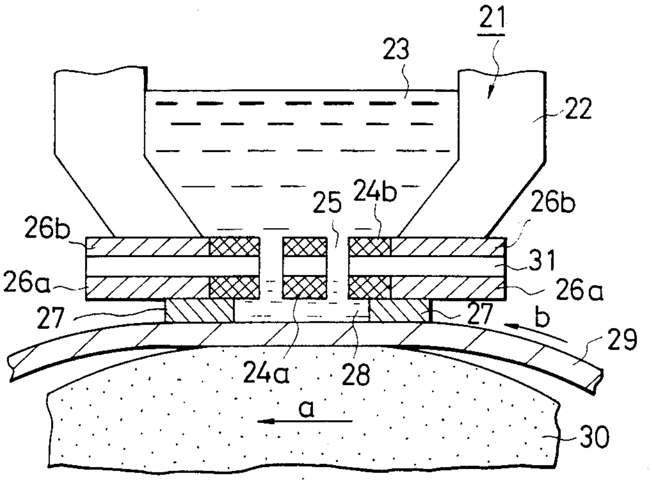
FIG. 15 is a schematic cross-sectional view of a fourth preferred embodiment of a recording head and its related portion in accordance with the present invention.
Figure 16:
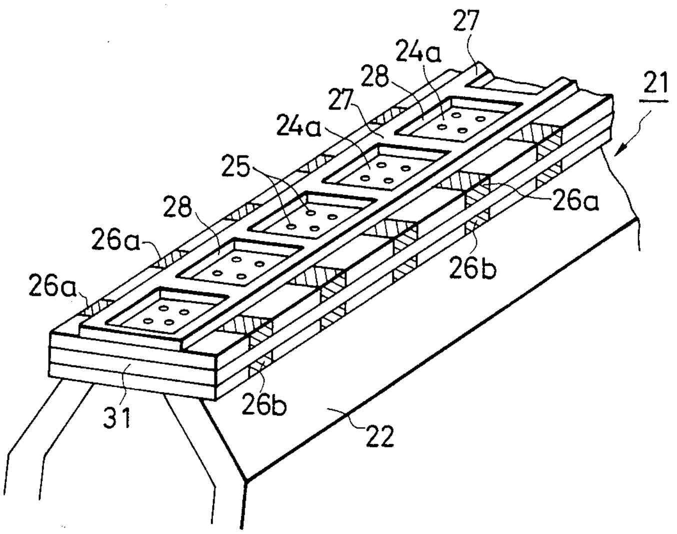
FIG. 16 is a schematic view of the external appearance of a multi-type recording head to which the third embodiment is applied and which has a recording portion constructed in the form of a linear array.

FIG. 15 is a schematic cross-section of a recording head constituting the fourth preferred embodiment of the present invention, and FIG. 16 is a schematic view of the external appearance of a multi-type recording head to which the fourth embodiment is applied and which has a recording portion constructed in the form of a linear array.

Referring to FIGS. 15 and 16, a recording head indicated generally at 21 has a housing 22 for storing therein a so-called heat fusible ink 23 (including ink of the type that is softened or sublimated by heat) The heat fusible ink 3 maintains high viscosity in a semisolid state at room temperature, but as the temperature is elevated, the viscosity is lowered.

A head carrier is mounted on the front surface of the housing 22 in face-to-face relationship with recording paper 29. The head carrier comprises an electrically insulated substrate 31 having on its opposite sides ink transfer heating elements 24*a* and ink supply heating elements 24*b*. The plurality of heating elements 24*a* and 24*b*, as shown in FIG. 16, are arranged in an array at a 1 mm pitch, respectively Each of the heating elements 24*a* and 24*b* is provided with four ink passage holes 25, and the ink passage holes 25 each having a diameter of 0.2 mm extend through the elements 24*a* and 24*b*, that is, the head carrier.

The respective heating elements 24*a* and 24*b* are connected to first and second electrodes 26*a* and 26*b* made of aluminum, which electrodes can be energized in response to an image signal. The respective heating elements 24*a* and 24*b* are adapted to individually generate heat by selectively applying voltages to the electrodes 26*a* and 26*b*.

Moreover, as shown in FIG. 16, a frame-shaped window 27 made of fluorine resin is disposed over the heating elements 24*a* in a continuously extending manner. The window 27 has a thickness of 0.05 mm, and has a frame-like shape in which a plurality of discrete, rectangular ink containing portions 28 are arranged in an array over the heating elements 24*a*, the size of each ink containing portion 28 being 0.8 mm×0.8 mm. The ink transferred from the ink containing portions 28 constitutes the dots of a recorded image. It is to be noted that, the configuration of the ink containing portions 26 is not necessarily confined solely to the aforesaid rectangular shape. Therefore, the ink containing portions 26 may be provided with a configuration corresponding to the arrangement of the dots for forming an image, and, as an example, a circular form could be preferred.

When recording is to be effected by means of the aforesaid recording head 1, the window 27, as shown in FIG. 15, is brought into contact with a recording medium such as recording paper 29 and thus a predetermined image is recorded on the recording paper 29 while it is being conveyed by the rotation of a platen roller 30 in the direction of an arrow a.

Next, the case of recording an image by means of the recording head 1 will be described with reference to FIGS. 17A through 17D.

First, electric voltages are applied in a pulsed manner (24 V×20 ms) to a group of the ink supply heating elements 24*b* through the second electrodes 26*b*. Thus, the heating elements 24*b* are caused to generate heat, thereby heating the semisolid ink 23 present in the vicinity of the heating elements 24*b*. Since the ink 23 exhibits a high viscosity at room temperature, it does not pass thorugh the ink passage holes 25 in this state. However, when the ink 3 is heated in the above-mentioned manner, its viscosity is lowered, thereby allowing the ink 3 to pass through the ink passage holes 25.

As the ink 3 passes through the ink passage holes 25 in the aforesaid manner, it spreads into the interiors of the ink containing portions 28. Since the ink 3 radiates heat during this time, it resumes a semisolid state or similar states. At this time, it is preferred that a static pressure higher than atmospheric pressure (for example, a gauge pressure of about 0.1 atmospheres) is applied to the interior of the housing 22 so as to accelerate passage of the ink 3 through the ink passage holes 25.

Figure 17A:
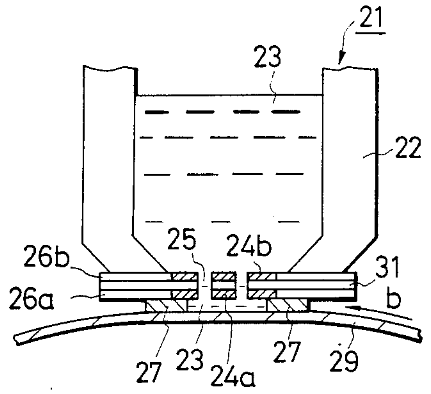
FIGS. 17A, 17B, 17C and 17D are respectively schematic illustrations used as an aid in explaining a recording process employing the recording head shown in FIG. 16.
Figure 17B:
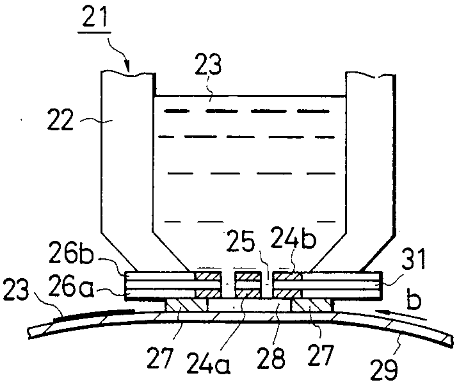
Figure 17C:
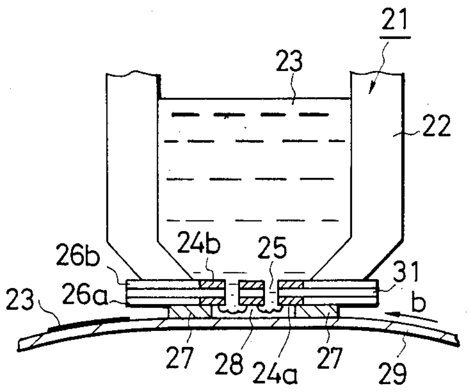
Figure 17D:
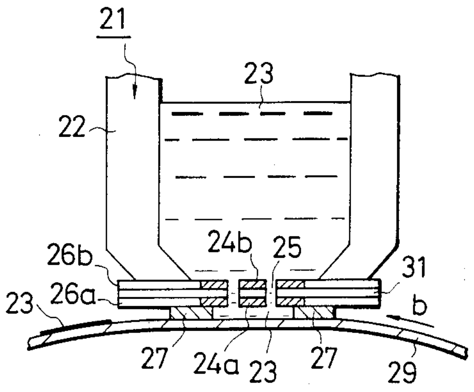

Next, voltages are applied through the first electrodes 26*a* to the ink transfer heating elements 24*a* in response to the image signal generated by the control section (not shown), thereby selectively heating the heating elements 24*a* (the state shown in FIG. 17A). The semisolid ink 3 present in the ink containing portions 28 adjacent to the selectively-heated elements 24*a* is reduced in viscosity, leaving the ink containing portions 28, and transferred onto the recording paper 29 which is being conveyed in the direction of an arrow b (the state shown in FIG. 17B). Subsequently, when pulsed voltage are applied through the second electrodes 26*b*, the ink 3 is reduced in viscosity by the heat generated by the ink supply heating elements 24*b*, and is supplied from the housing 2 through the ink passage holes 25 to the interiors of the ink containing portions 28 (the state shown in FIG. 17C). As described previously, the ink 3 reassumes a semisolid state owing to the heat which is radiated by the ink 3 while it is spreading into the ink containing portions 8 (the state shown in FIG. 17D).

The above-described process is repeated in response to an image signal until record dots corresponding to the respective sizes of the ink containing portions 28 are continuously formed on the recording paper 29, thereby achieving transfer of an ink image.

Specifically, when a voltage equivalent to one pulse is applied to the ink transfer heating elements 24*a*, the ink 23 present in the ink containing portions 28 is transferred onto the recording paper 29. Immediately after the transfer, voltages equivalent to one pulse are applied to the ink supply heating elements 24*b*, thereby supplying the ink 23 through the ink passage holes 25 to the interiors of the ink containing portions 28. In other words, the ink transfer heating elements 24*a* have the function of transferring ink onto the recording paper 29 while the ink supply heating elements 24*b* have the function of supplying ink to the ink containing portions 28.

In order to suitably carry out recording as stated in the description of the fourth embodiment, the ink supply heating elements 24*b* are preferably set such as to generate heat slightly later than the heat generation of the ink transfer heating elements 24*a*. As a matter of course, this order of heat generation is only illustrative. As will be clear from the following description, the present invention is not limited to the aforesaid arrangement.

As described above, in the arrangement of the fourth preferred embodiment, the only ink present in the ink containing portions 28 is transferred onto the recording paper 29, and, subsequently to the transfer, ink is newly supplied to the ink containing portions 28. In consequence, it is possible to transfer and record an image without involving the phenomenon of ink trailing or the like.

It is to be noted that, although the fourth embodiment premises that the ink transfer heating elements 24*a* are caused to generate heat prior to the timing of heat generation from the ink supply heating elements 24*b*. However, the present invention is not limited to this arrangement; for example, the elements 24*a* and 24*b* may be arranged to generate heat at the same time. In this case, the process of supplying the ink 23 its viscosity reduced in the ink passage holes 25 to the ink containing portions 28 through the ink passage holes 25 further requires the drift of ink as compared with the thermal transfer process of the ink from the ink containing portions. Therefore, even if the ink transfer heating elements 24*a* and the ink supply heating elements 24*b* generate heat at the same time, there is no risk of providing critical difficulties for the aforesaid recording mechanism.

Figure 18:
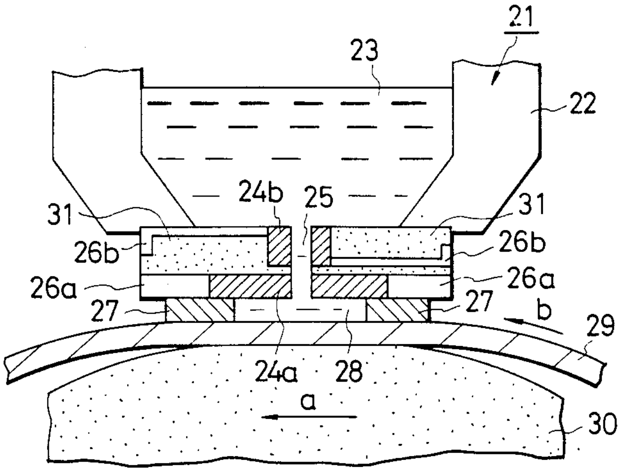
FIG. 18 is a schematic cross-sectional view of a modified form of the fourth embodiment of a recording head of this invention.

FIG. 18 is a schematic cross-sectional view of the fifth embodiment of the present invention. In the fifth embodiment, the ink supply heating elements 24*b* are provided in the interiors of the ink passage holes 25. Such an arrangement also provides the same ink supply effect as that of the fourth embodiment, and recording can be effected on the recording paper 29 by means of the same recording mechanism. In this case, each of the ink containing portions 28 is preferably provided with one ink passage hole 25. The ink supply heating elements 24*b* could be disposed around the periphery of the ink passage holes 25.

In the above-described fifth embodiment, the ink transfer and supply heating elements 24*a* and 24*b* are composed of resistive carbon, but the use of carbon material is solely illustrative. It is possible to utilize any material that can be heated by the application of electricity. Instead of the above noted resistive carbon, for example, a substance such as tantalum nitride or ruthenium oxide may be deposited on a heat-resistant substrate made of ceramic, polyimide or other materials. The electrodes 26*a* and 26*b* could be composed of copper or an alloy including, for example, nickel, chrome or gold.

In addition, the levels of the pulsed voltages applied to the heating elements 24*a* and 24*b* and the number of the ink passage holes 25 as well as the level of pressure applied to the ink 3 need not necessarily be limited to those of the aforesaid fifth embodiment. It is a matter of course that these features may be modified as required in accordance with the kinds of ink used, the sizes of the ink passage holes 25 and the ink containing portions 28 and other factors.

The sixth embodiment will be described below with reference to FIGS. 19 to 22B.

The sixth embodiment which will be explained below in detail essentially comprises: a housing capable of storing ink therein; an electrically insulated substrate disposed on the housing; heating elements disposed on the housing and selectively heated in response to an image signal; a plurality of discrete ink containing portions disposed over the heating elements and a plurality of ink passage holes providing communication between the interior of the housing and the ink passage holes; and ink supplying means for supplying ink from the housing to the ink containing portions, whereby recording is effected by means of the thus-constructed recording head.

A recording method used for the sixth embodiment which will be described in detail later comprises the steps of: bringing the ink containing portions of the recording head into contact with a recording medium such as copying paper; causing both of them to move relative to each other while making the heating elements to generate heat in response to an image signal; supplying ink from the housing through the ink passage holes to the ink containing portions by the ink supplying means; reducing the viscosity of the ink in the ink containing portions, transferring the thus-softened ink onto the recording medium; and immediately supplying ink from the housing into the ink containing portions through the ink supplying means.

Therefore, the only ink stored in the ink containing portions is transferred onto the recording medium, and this substantially prevents the occurrence of the phenomenon of ink tailing or the like.

The above-mentioned sixth preferred embodiment will be described below in detail.

Figure 19:
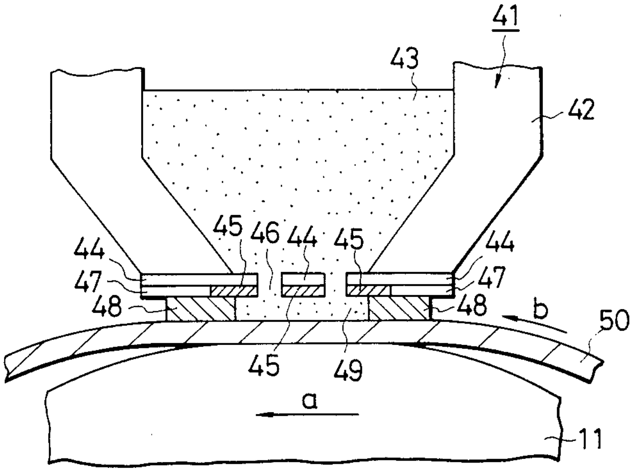
FIG. 19 is a schematic cross-sectional view of a fifth preferred embodiment of a recording head and its related portion in accordance with the present invention.
Figure 20:
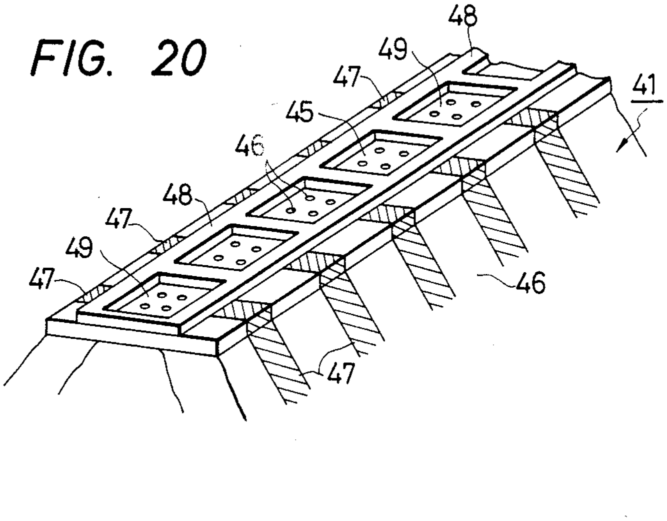
FIG. 20 is a schematic view of the external appearance of a multi-type recording head to which the fourth embodiment is applied and which has a recording portion constructed in the form of a linear array in accordance with the present invention.

FIG. 19 is a schematic cross-section of the sixth preferred embodiment of a recording head in accordance with the present invention, and FIG. 20 is a schematic view of the external appearance of a multi-type recording head to which the sixth embodiment is applied and which has a recording portion constructed in the form of a linear array.

Referring to FIGS. 19 and 20, the recording head indicated generally at 41 has the housing 2 for storing therein the so-called heat fusible ink 3 (including ink of the type which is softened or sublimated by heat). The heat fusible ink 3 maintains high viscosity in a semisolid form at room temperature, but as the temperature is elevated, the viscosity is lowered.

The housing 42 is provided with an electrically insulated substrate 44 made of alumina ($Al_2O_3$), and heating elements 45 made of ruthenium oxide ($RuO_2$) are disposed over the substrate 44. As shown in FIG. 20, the heating elements 45 are arranged in an array at a 1 mm pitch, and four ink passage holes 5 each haivng a diameter of 0.2 mm are so formed as to extend through both the respective heating elements 4 and the substrate 46.

The respective heating elements 4 are connected to electrodes 47 made of gold (Au) and the electrodes 47 are capable of being energized in response to the image signal supplied from a control section (not shown). The heating elements 47 are arranged to individually generat heat by selectively applying voltages to the electrodes 47.

Moreover, as shown in FIG. 20, a frame-shaped window 48 made of glass is disposed over the heating elements 25 in a continuously extending manner. The window 48 has a thickness of 0.05 mm, and has a frame-like shape in which a plurality of discrete, rectangular ink containing portions 49 are arranged in an array over the heating elements 45, the size of each ink containing portion 49 being 0.8 mm×0.8 mm. The ink transferred from the ink containing portions 49 forms the dots of a recorded image.

When recording is to be effected by means of the aforesaid recording head 41, the window 48, as shown in FIG. 19, is brought into contact with recording paper 50 used as a recording medium and thus a predetermined image is recorded on the recording paper 50 while it is being conveyed by the rotation of a platen roller 51 in the direction of an arrow a.

The case of recording an image by means of the recording head 41 will be described with reference to FIGS. 21A through 21D.

First, electric voltages are applied in a pulsed manner (24 V×20 ms) to the heating elements 4 through the electrodes 47. Thus, the heating elements 45 are caused to generate heat, thereby heating the semisolid ink 43 present in the vicinity of the heating elements 45. Since the ink 3 exhibits a high viscosity at room temperature, it does not pass through the ink passage holes 46 in this state. However, when the ink 43 is heated in the above-mentioned manner, the viscosity is lowered, thereby allowing the ink 43 to pass through the ink passage holes 46.

As the ink 43 passes through the ink passage holes 46 in the aforesaid manner, it spreads into the interiors of the ink containing portions 49. Since the ink 43 radiates heat during this time, it resumes a semisolid state or similar states. At this time, it is preferred that a static pressure higher than atmospheric pressure (for example, a gauge pressure of about 0.1 atmosphere ) is applied to the interior of the housing 42 so as to accelerate supply of the ink 43 to the ink containing portions 49.

Figure 22A:
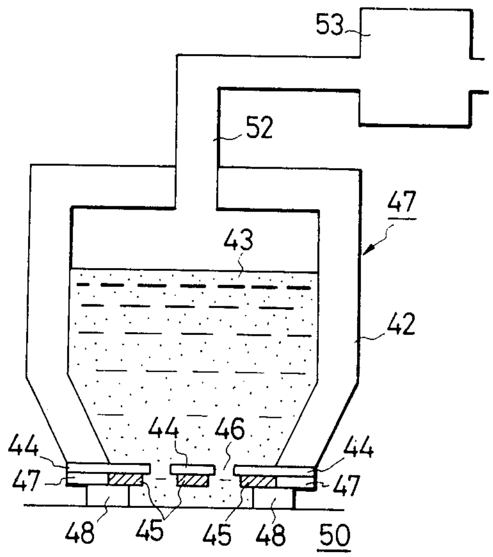
FIGS. 22A, 22B and 22C are respectively schematic illustrations of pressuring means in accordance with the present invention.

Referring to FIG. 22A, an air compressor 53 for applying a static pressure is connected to an ink supplying means for supplying ink to the interior of the housing 42 and the ink containing portions 49. A pipe 52 is disposed to introduce air into the housing 42. The air compressor 53 is capable of applying a constant level of pressure to the ink 43 or applying a pulsed pressure in synchronism with an image signal.

Figure 21A:
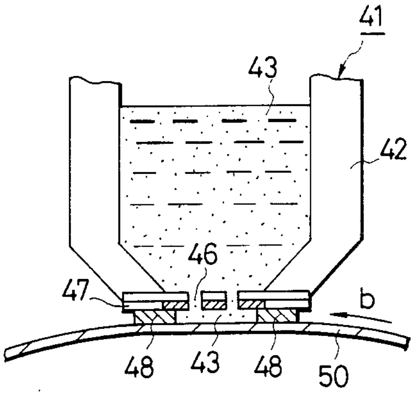
FIGS. 21A, 21B, 21C and 21D are respectively schematic illustrations used as an aid in explaining a recording process employing the, recording head shown in FIG. 20.

Next, voltages are applied to the heating elements 45 in response to an image signal, thereby selectively heating the heating elements 45 (the state shown in FIG. 21A). The semisolid ink 43 present in the ink containing portions 49 adjacent to the selectively-heated elements 45 is reduced in viscosity, leaving the ink containing portions 49, and transferred onto the recording paper 50 which is being conveyed in the direction of an arrow b (the state shown in FIG. 21B). Subsequently, when the ink containing portions 49 become empty upon completion of the transfer, the ink 43 which has been reduced in viscosity by the heat generated by the heating elements 45 is newly supplied from the housing 42 through the ink passage holes 46 to the interiors of the ink containing portions 49 (the state showh in FIG. 21C). As described previously, the ink 43 reassumes a semisolid state owing to the heat which is radiated by the ink 43 while it is spreading into the ink containing portions 49 (the state shown in FIG. 21D).

The above-described process is repeated in response to an image signal until record dots corresponding to the respective sizes of the ink containing portions 49 are continuously formed on the recording paper 50, thereby achieving transfer of an ink image. During this time, the ink 43 is pressurized in the direction of the ink passage holes 46 by the ink supplying means 53. It is therefore possible to supply the ink 43 to the ink containing portions 49 and to transfer an image onto the recording paper 50.

The recording head 41 constiuting the sixth preferred embodiment has the ink containing portions 49 the depth (0.05 mm) of which is smaller than the radius (0.1 mm) of each of the ink passage holes 46. Therefore, in a case where the heating elements 45 are heated, the heat is transmitted to ink 43 present in the ink containing portion 46 faster than in the ink passage holes 46. Accordingly, slightly prior to time at which the ink 43 in the ink passage holes 46 is reduced in viscosity and then passes through the same holes 46, the viscosity of the ink 43 present in the ink containing portion 49 is reduced, so that the ink 43 is transferred onto the recording paper 49.

In other words, when a voltage equivalent to one pulse is applied to each of the heating elements 45, the ink 43 in the ink containing portions 49 is first transferred onto the recording paper 50. Immediately after the transfer, the ink 43 is supplied through the ink passage holes 46 to the ink containing portions 49 which have just been emptied.

As is evident from the foregoing, in the sixth embodiment, the only ink present in the ink containing portions 49 is transferred onto the recording paper 50, and then an adequate quantity of ink is smoothly supplied to the ink containing portions 49. Accordingly, transfer and recording of an image can be effected without involving the phenomenon of ink trailing or the like.

In the aforesaid embodiment, the depth of the ink containing portion 49 is made smaller than the radius of the associated ink passage holes 46 so as to establish a time lag between the conduction of heat to the ink 43 in the ink containing portions 49 and that of heat to the ink 43 in the associated ink passage holes 46. However, the sixth embodiment is not limited to such an arrangement. For example, adiabatic coats may be formed on the respective inner surfaces of the ink passage holes 46 or may also be interposed between the substrate 44 and the heating elements 45. This also makes it possible to delay the conduction of heat to the ink 43 in the ink passage holes 46 with respect to that to the ink 43 in the associated ink containing portions 49. In consequence, one application of a voltage equivalent to one pulse enables the same process as that of the aforementioned sixth embodiment.

Figure 21B:
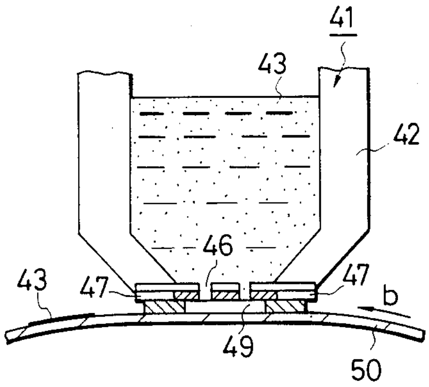
Figure 21C:
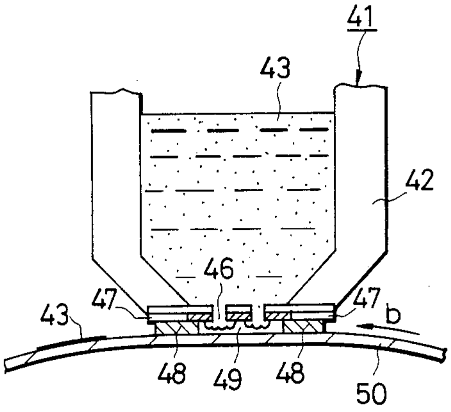
Figure 21D:
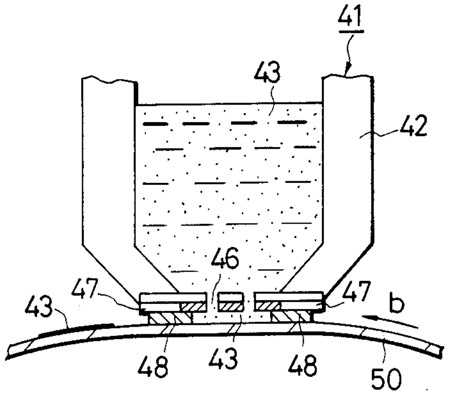

Also, the sixth embodiment may not necessarily be arranged in such a manner that, as described above, one application of a voltage equivalent to one pulse allows for printing of one dot. For example, as shown in FIGS. 21A and 21B, the ink 43 in the ink containing portions 49 is transferred onto the recording paper 50 in response to a first application of one pulse, and, as shown in FIGS. 21C and 21D, the ink 43 is newly supplied to the same ink containing portions 49 in response to a second application of one pulse. In this manner, one cycle of pulse application may be constituted by two applications of pulses, that is, the heating elements 45 could be heated twice so as to complete printing of one dot.

Figure 22B:
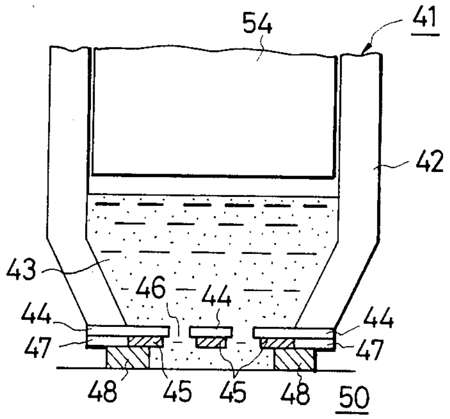

In the aforesaid sixth embodiment, while the air compressor 53 is used as ink supplying means for the purpose of applying to the interior of the housing 42 a static pressure at a level higher than atmospheric pressure, this arrangement is, of course, only illustrative. For example, as shown in FIG. 22B, a piston 54 may be disposed to pressurize the ink 43 in the housing 42. If the piston 54 is operated to apply pressure to the ink 43, the same effect can be achieved.

Figure 22C:
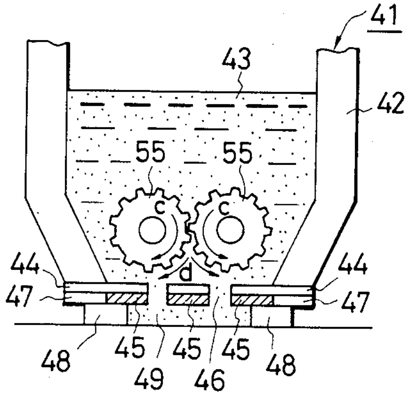

FIG. 22C shows another example of the ink supplying means. The housing 42 includes a pair of rotary toothed wheels 55, and thus a suitable level of pressure can be applied to the ink 43 by rotating the rotary toothed wheels 55 in the respective directions of arrows c. In this case, the ink 43 is allowed to flow in the directions of arrows d as viewed in FIG. 22C, transferred to the ink containing portions 49 through the ink passage holes 46. It will be appreciated from the foregoing that the ink supplying means may be disposed on the exterior or interior of the recording head 41.

The substrate 44 may be constituted by a metal sheet or the like coated with glass, an insulating coat, alumina or other ceramic materials.

The heating elements 45 may be constituted by ruthenium oxide, NiCr, Cr-$SiO_2$ or other materials which could be heated through energization.

The electrodes 47 may be composed of not only gold but also copper or an alloy including, for example, alumiium, nickel or chrome.

In addition, the level of the pulsed voltage applied to the heating elements 45 and the number of the ink passage holes 46 as well as the level of pressure applied to the ink 43 need not necessarily be limited to those of the aforesaid first embodiment. It is a matter of course that these features may be modified as required in accordance with the kinds of ink used, the sizes of the ink passage holes 46 and the ink containing portions 49 and other factors.

The modified forms and their examples of the above-described embodiments of the present invention will be described below with specific reference to FIG. 23 as well as FIGS. 2 to 5B.

The following description relates generally to the embodiment shown in FIGS. 2 to 5B, and more specifically to a window which is composed of heat resistant material disposed over the heating elements for forming a plurality of discrete ink containing portions.

In the aforesaid embodiment, the window is made of heat resistant material. Therefore, even if heated by the heating elements at high temperatures, the window is subjected to neither deformation nor oxidization.

In general, a heat resistant resin is preferably used for the aforesaid window 7 made of heat resistant material. In this case, it is preferable to use a heat resistant resin of the kind which is not subjected to decomposition, oxidization and other degradation eve if it is heated at a high temperature for a long period of time. For example, it is recommended to employ a resin having the mechanical nature which is usable for 400 hours at 330° C., for 80 hours at 538° C. in accordance with the provisions enacted by NASA. More specifically, the aforesaid heat resistant material could be selected from the group consisting of polyimide, polyamide imide, polyester imide, polybenzimidazole, polyparaxylylene, polyphenylene oxide, polysulfone, poly-4-methylpentene, aromatic polyamide and the like.

It is to be noted that the window 7 may be composed of materials such as ceramic and metal as well as the above noted heat resistant resins. The ceramic may be selected from the group consisting of alumina ($Al_2O_3$), magnesia ($MgO$), zirconia ($ZrO_2$), beryllia ($BeO$), thoria ($ThO_2$), spinel ($MgO.Al_2O_3$), cordierite, zircon, alumina titanate ceramics, lithia ceramics, devitro ceramics, tungsten carbide, titanium carbide, boron carbide, titanium boride, thermet and the like. The aforesaid metal may be selected from the group consisting of martensite or ferritic steel including chromium (Cr) as the main alloy element, the aforesaid steel to which Si, Al and the like are added so as to improve its oxidation resistance with respect to high temperature, austenic stainless steel, the aforesaid steel to which Nb, Ti and the like are added so as to improve its stability, the aforesaid steel to which Mo, Cu and the like are added so as to improve its corrosion resistance with respect to high temperature, and the aforesaid steel to which Mo, Nb and the like are added so as to improve the strength with respect to high temperature.

EXAMPLES

The following examples are the results of experiments conducted with the above noted constructions.

EXAMPLE 1

Apart from the composition of the window 7, the recording head 1 shown in FIGS. 2 and 3 were used to obtain a recorded image under the same conditions as those used in the aforesaid Example 1.

The frame-like window 7 made of polyimide resin was formed over the heating elements 4.

Figure 23A:
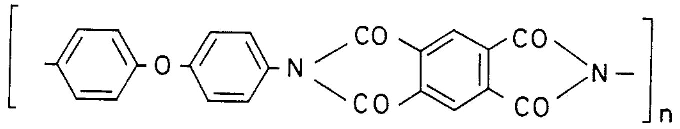
FIGS. 23A, 23B and 23C respectively show the structural formulas of the material of a window formed in the recording head in accordance with the present invention.
Figure 23B:
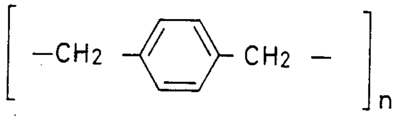
Figure 23C:
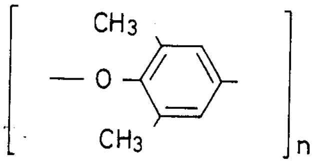

The polyimide resin has a structure as shown in part A of FIG. 23 ("Kapton Type H Film" manufactured by duPont). The aforementioned ink containing portion 8 made of such material was shaped in the form of an array with a thickness of 0.05 mm and dimensions of 0.8 mm by 0.8 mm.

Transfer and recording were effected onto the recording paper 9 under the same conditions as those of the previously described Example 1.

As the result that a pulsed voltage was applied to effect image recording,a clearly recorded image was obtained without involving various phenomena such as ink trailing and ink overlapping.

In addition, the window 7 of the recording head 1 was free from deformation, demineralization, dispersion, oxidization and any other degradation.

EXAMPLE 2

Apart from the fact that the window 7 was composed of polyparaxylylene ("Parylene N" manufactured by UCC) having the structure shown in part B of FIG. 23, an image was transferred and recorded onto the recording paper 9 under the same conditions as those used in the above-described Example 1.

As the result that a pulsed voltage was applied to effect image recording, a clearly recorded image was obtained without involving various phenomena such as ink trailing and ink overlapping. The quality of the thus-obtained image was as high as that of the aforementioned Example 1, and no degradation of the window 7 was found.

EXAMPLE 3

Apart from the fact that the window 7 was composed of polyphenylene oxide having the structure shown in part C of FIG. 23, an image was transferred and recorded onto the recording paper 9 under the same conditions as those used in the above-described Example 1.

As the result that a pulsed voltage was applied to effect image recording, a clearly recorded image was obtained without involving various phenomena such as ink trailing and ink overlapping. The quality of the thus-obtained image was as high as that of the aforementioned Example 1, and no degradation of the window 7 was to be found.

EXAMPLE 4

Apart from the fact that the window 7 was composed of vinyl chloride resin, an image was transferred and recorded onto the recording paper 9 under the same conditions as those used in the above-described Example 1.

In this case, since the heating elements 4 were heated above the softening point of the window 7 by a pulsed voltage, the window 7 was softened. It was thus impossible to obtain any recorded image.

EXAMPLE 5

Apart from the fact that the window 7 was composed of polyethylene resin, an image was transferred and recorded onto the recording paper 9 under the same conditions as those used in the above-described Example 1.

In this case as well, since the heating elements 4 were heated above the softening point of the window 7 by the pulsed voltage, the window 7 was softened. It was thus impossible to obtain any recorded image.

As is evident from the foregoing examples, the window 7 which forms the ink containing portions 8 is further preferably composed of a heat resistant material in order to obtain a clearly recorded image.

Furthermore, the aforesaid window 7 could be composed of glass material, and the glass-made window are also superior in heat resistance, abrasion resistance and electrical insulation. In this case as well, even if such a window is heated up to a further high temperature by the heating elements, it is never deformed nor oxidized. The aforementioned glass material is defined as glass having a crystalline form which becomes amorphous once it is heat-fused and quenched. The amorphous state is defined as the state of the glass in which no crystalline form thereof is detected through X-ray diffraction, the crystal size being 50 angstrome or less. The window 7 is preferably composed of a low-melting-point glass having a softening point within the temperature range of 150° C. to 1700° C., more preferably 200° C. to 1300° C., and most preferably 250° C. to 900° C.

The softening point of the aforesaid glass represents a temperature when the viscosity of the same is $10^{7.65}$ Poise, and is a characteristic value widely used as a practical reference value for shaping and working. It is to bennoted that, if the softening point is 150° C. or less, the heat resistance is lowered. Thus, the heat generated by the heating elements 4 may cause softening and deformation of the window 7; further, the heat might cause decomposition and oxidization of the same. Accordingly, the softening point is preferably 150° C. or more.

It is therefore possible to employ any conventional type of glass having a softening point within the aforesaid range.

For example, the glass may be selected from the group consisting of quartz glass, boro-silica glass, crystallized glass, chalcogens glass, alumino-silica glass, "Pyrex", "Vycor", enamel, borate glass, phosphorous-silica glass, silicate glass, slag glass, glass ceramics, and organic glass. However, these components are only illustrative, and it is also possible to combine various metal oxides.

EXAMPLES

The following examples are the results of experiments conducted with the above noted compositions.

EXAMPLE 1

Apart from the composition of the window 7, the recording head 1 shown in FIGS. 2 and 3 were used to obtain a recorded image under the same conditions as those used in the aforesaid Example 1.

The frame-like window 7 was disposed over the heating elements 4, which window was made of sodalime-system glass ($Na_2O$-$CaO$-$SiO_2$) and a softening point of 720° C.

Transfer and recording wer effected onto the recording paper 9 under the same conditions as those of the previously described Example 1.

As the result that a pulsed voltage was applied to effect image recording, a clearly recorded image was obtained without involving phenomena such as ink trailing and ink overlapping.

In addition, the window 7 of the recording head 1 was free from deformation, demineralization, dispersion, oxidization and any other degradation.

EXAMPLE 2

Apart from the fact that the window 7 was composed of quartz glass, an image was transferred and recorded onto the recording paper 9 under the same conditions as those used in the above-described Example 1.

As the result that a pulsed voltage was applied to effect image recording, a clearly recorded image was obtained without involving phenomena such as ink trailing and ink overlapping. The quality of the thus-obtained image was as high as that of the aforementioned Example 1, and neither degradation nor abrasion of the window 7 was to be found.

EXAMPLE 3

Apart from the fact that the window 7 was made of chalcogenide glass (softening point: 155° C.) having a composition of 35 mol % arsenic, 40 mol % sulfur and 25 mol % thallium, an image was transferred and recorded onto the recording paper 9 under the same conditions as those used in the above-described Example 1.

As the result that a pulsed voltage was applied to effect image recording, a clearly recorded image was obtained without involving phenomena such as ink trailing and ink overlapping. The quality of the thus-obtained image was as high as that of the aforementioned Example 1, and no degradation of the window 7 was to be found.

When the recording of solid black was experimentally repeated for ten thousand hours, the window 7 was softened and deformed due to heat. However, under service conditions such as image processor and printer which are normally used, neither softening nor deformation of the window 7 was to be found; and further, there was no abrasion of the same which might be caused by the contact with the recording paper 9.

EXAMPLE 4

Apart from the fact that the window 7 was made of chalcogenide glass (softening point: 100° C.) having a composition of 35 mol % arsenic, 40 mol % sulfur and 25 mol % thallium, an image was transferred and recorded onto the recording paper 9 under the same conditions as those used in the above-described Example 1.

In this case, since the heating elements 4 were heated above the softening point of the window 7 by a pulsed voltage, the window 7 was softened. It was thus impossible to obtain any recorded image.

EXAMPLE 5

Apart from the fact that the window 7 was made of plastics such as polyethylene, polyvinyl chloride, polypropylene, polycarbonate, polyvinyl alcohol, acetate, polyester and polystyrene, an image was transferred and recorded onto the recording paper 9 under the same conditions as those used in the above-described Example 1.

In this case, since the heating elements 4 were heated above the softening point of the window 7 by a pulsed voltage, the window 7 was softened and deformed. It was thus impossible to obtain any recorded image.

EXAMPLE 6

Apart from the fact that the window 7 was made of steel material such a stainless steel, copper, aluminium, titanium, magnesium, nickel, cobalt, zinc, lead, and an alloy thereof or non-ferrous material, an image was transferred and recorded onto the recording paper 9 under the same conditions as those used in the above-described Example 1.

In this case, since the window 7 has conductivity, the heating elements 4 was not heated up to an adequately high temperature. It was therefore impossible to obtain a good recorded image.

In addition, in a case where the window 7 was placed in high-temperature environment, a problem arose in that the surface of the window 7 was corroded.

As is evident from the foregoing examples, it is further suitable for image recording to constitute the window 7 defining the ink containing portions 8 with a glass material having a softening point within a predetermined temperature range.

As will be understood from the above description of the preferred embodiments, even if the window which defines the ink containing portions is made up of glass material, the window is neither deformed nor softened by the heat generated by the heating elements. Moreover, the window is not subjected to abrasion when the window comes into frictional contact with a recording medium such as recording paper. In addition, since the window is also superior in electrical insulation, the energy efficiency is improved and the clear recording of images can be achieved.

As described above, the present invention succeeds in enabling clear recording of images free from ink trailing, ink overlapping and the like.

What is claimed is:

1. A recording head comprising:
   - an ink housing for storing ink therein;
   - a plurality of ink passage portions for allowing ink to pass from said ink housing means;
   - a plurality of heating means capable of being selectively actuated for selectively passing ink through said plurality of ink passage portions; and
   - spacer means disposed between said ink passage portions and a recording medium, said spacer means defining an ink containing portion for temporarily containing the ink passing through said ink passage portions, wherein
   - said heating means is actuated for a first predetermined period of time to allow a quantity of ink to flow into said ink containing portion and for a second predetermined period of time to allow the quantity of ink to flow from said ink containing portion onto the recording medium.

2. The recording head according to claim 1, wherein a depth of said spacer means is smaller than a radius of each of said ink passage portions.

3. The recording head according to claim 1, wherein said heating means is arranged to generate heat in response to a signal representative of an image to be transferred.

4. The recording head according to claim 1, wherein said spacer means is composed of a material having a low wettability with respect to said ink.

5. The recording head according to claim 1, wherein said spacer means is composed of fluorine resin.

6. The recording head according to claim 1, wherein said spacer means is composed of fluorine resin having a critical surface tension of 31 dyn/cm or less.

7. The recording head according to claim 1, wherein said heating means includes ink transfer heating means and ink supply heating means, both of which are selectively heated in response to an image signal.

8. The recording head according to claim 7, wherein said ink supply heating means is attached to an interior position and peripheral portion of said ink passage portions.

9. The recording head according to claim 1, wherein said spacer means is made of a heat resistant material.

10. The recording head according to claim 1, wherein said spacer means is made of a glass material.

11. The recording head according to claim 1, wherein said spacer means is composed of a glass material having a softening point of 150° C. or more.

12. The recording head according to claim 1, wherein said spacer means includes an opening through which said ink is passed.

13. The recording head according to claim 1, wherein said spacer means has one of slanted and curved surfaces along which said ink is passed.

14. The recording head according to claim 1, wherein said ink passage portions are formed by changing the thickness of said spacer.

15. The recording head according to claim 1, wherein said ink housing is stores ink which is one of semisolid, paste-like and highly viscous types.

16. A method of carrying out recording with the use of a recording head comprising the steps of:

moving an ink housing with respect to a recording medium with spacer means interposed therebetween, said housing including ink passage portions through which ink is passed and heating means for heating the ink;

actuating said heating means for a first predetermined period of time so that a quantity of ink flows into an ink containing portion defined by said spacer means; and actuating said heating means for a second predetermined period of time so that the quantity of ink flows from said ink containing portion onto the recording medium.

17. The method according to claim 16, further comprising the step of providing said spacer means with a depth which is smaller than a radius of each of said ink passage portions.

18. The method according to claim 16, wherein said heating means generates heat in response to a signal representative of an image to be transferred.

19. The method according to claim 16, wherein said spacer means is a material having low wettability with respect to the ink.

20. The method according to claim 16, wherein said spacer means is a fluorine resin.

21. The method according to claim 16, wherein said spacer means is a fluorine resin having a critical surface tension of 31 dyn/cm or less.

22. The method according to claim 16, wherein said heating means includes ink transfer heating means and ink supply heating means, and further comprising the steps of selectively heating said ink transfer heating means and said ink supply heating means in repsonse to an image signal.

23. The method according to claim 16, further comprising the step of providing ink supply heating means to one of an interior portion and a peripheral portion of said ink passage portions.

24. The method according to claim 16, wherein said spacer means is a heat reisitant material.

25. The method according to claim 16, wherein said spacer means is a glass material.

26. The method according to claim 16, wherein said spacer means is a glass material having a softening point of 150° C. or more.

27. The method according to claim 16, further comprising the step of providing openings in said spacer means through which the ink is passed.

28. The method according to claim 16, further comprising the step of providing slanted and curved surfaces in said spacer means along which the ink is passed.

29. The recording head and the method according to claim 16, further comprising the step of forming the ink passage portions by changing the thickness of said spacer.

30. The method according to claim 16, wherein said ink housing stores ink which is one of semisolid, paste-like and highly viscous types.

31. A recording head comprising:

an ink housing capable of storing ink therein;

porous heating means disposed on said ink housing nad being selectively heated in response to an image signal; and spacer means disposed between said porous heating means and a recording medium, said spacer means defining a plurality of discrete ink containing portions which temporarily contain a quanity of ink prior to the ink being emitted onto a recording medium, wherein said heating means is actuated for a first predetermined period of time to allow the quantity of ink to flow into said ink containing portion and for a second predetermined period of time to allow the quantity of ink to flow from said ink containing portion onto the recording medium.

32. A method of recording comprising the steps of:

bringing a plurality of ink containing portions into contact with a recording medium, said plurality of ink containing portions descretely formed proximate to porous heating means and in fluid communication with an ink supply tank;

causing relative movement between said ink containing portions and a recording medium;

actuating said heating means for a first predetermined period of time so that a quantity of ink flows into said ink containing portions; and actuating said heating means for a second predetermined period of time so that the quantity of ink flows from said ink containing portions onto the recording medium.

33. A recording head comprising:

an ink housing capable of storing ink therein;

an electrically insulated substrate disposed on said ink housing;

heating means disposed on said housing and being selectively heated in response to an image signal;

a plurality of discrete ink containing portions disposed adjacent said heating means for temporarily containing the ink;

ink passage means providing communication between the interior of said ink housing and said ink containing portions; and ink supplying means for supplying ink from said ink housing to said ink containing portions, wherein said heating means is actuated for a first predetermined period of time to allow a quantity of ink to flow into said ink containing portions and for a second predetermined period of time to allow the quantity of ink to flow from said ink containing portions onto the recording medium.

34. The recording head according to claim 33, wherein said ink supplying means is pressurizing means.

35. The recording head according to claim 33, wherein a depth of said ink containing portion is smaller than a radius of said ink passage hole.

36. A method of carrying out recording with the use of a recording head including a plurality of discrete ink containing portions communicating with an interior of an ink housing; ink supplying means for supplying ink to said ink containing portions; and heating means for heating the ink, which comprises the steps of:

bringing said ink containing portions into contact with a recording medium;

moving said ink containing portions with respect to said recording medium;

actuating said heating means for a first predetermined period of time so that a quantity of ink flows into said ink containing portions defined by said spacer means; and actuating said heating means for a second predetermined period of time so that the quantity of ink flows from said ink containing portions onto the recording medium.

* * * * *

UNITED STATES PATENT AND TRADEMARK OFFICE
CERTIFICATE OF CORRECTION

PATENT NO. : 4,782,347

DATED : November 1, 1988

INVENTOR(S) : Kurematsu, et al.

It is certified that error appears in the above-identified patent and that said Letters Patent is hereby corrected as shown below:

COLUMN 2
Line 39, "multi type" should read --multi-type--; and
Line 56, "rspectively" should read --respectively--.

COLUMN 3
Line 35, "the," should read --the--.

COLUMN 6
Line 7, "carnuba" should read --carnauba--;
Line 8, "candellilla wax," should read --candililla wax,--; and
Line 12, "Fischer-trophsch wax;" should read --Fischer-tropsch wax--.

COLUMN 9
Line 6, "aluminium-made" should read --aluminum-made--;
Line 26, "2000 rmp" should read --2000 rpm--; and
Line 32, "Liquid Paraffim" should read --Liquid Paraffin--.

COLUMN 11
Line 11, "inssuch" should read --in such--;
Line 22, "appulsed" should read --a pulse--;
Line 46, "selectivelyheated" should read --selectively-heated--; and
Line 54, "cut-outs 17a" should read --cutouts 17a--.

UNITED STATES PATENT AND TRADEMARK OFFICE
CERTIFICATE OF CORRECTION

PATENT NO. : 4,782,347

DATED : November 1, 1988

INVENTOR(S) : Kurematsu, et al.

It is certified that error appears in the above-identified patent and that said Letters Patent is hereby corrected as shown below:

COLUMN 12
Line 59, "dow 15" should read --dow 17--.

COLUMN 13
Line 11, "head" should read --heat--; and
Line 53, "eference" should read --reference--.

COLUMN 14
Line 65, "pulsed voltage" should read --pulsed voltages--.

COLUMN 15
Line 6, "present" should read --prevent--;
Line 20, "aluminium" should read --aluminum--; and
Line 43, "signal a" should read --signal, a--.

COLUMN 16
Line 11, "heat)" should read --heat).--;
Line 22, "respectively" should read --respectively.--;
Lines 44 and 46, "ink containing portions 26" should read --ink containing portions 28--; and
Line 67, "thorugh" should read --through--.

COLUMN 17
Line 23, "pulsed voltage" should read --pulsed votages--.

UNITED STATES PATENT AND TRADEMARK OFFICE

CERTIFICATE OF CORRECTION

PATENT NO. : 4,782,347

DATED : November 1, 1988

INVENTOR(S) : Nurematsu, et al.

It is certified that error appears in the above-identified patent and that said Letters Patent is hereby corrected as shown below:

COLUMN 18

Line 4, "elements 24b. How-" should read --elements 24b,--; and
Line 5, "ever," should be deleted.

COLUMN 19

Line 36, "haivng" should read --having--;
Line 38, "substrate 46" should read --substrate 44--; and
Line 43, "generat" should read --generate--.

COLUMN 20

Line 3, "ink 3" should read --ink 43--;
Line 41, "showh" should read --shown--; and
Line 62, "portion 46" should read --portion 49--.

COLUMN 22

Line 6, "alumiium," should read --aluminum,-- and
Line 33, "eve" should read --even--.

COLUMN 24

Line 23, "50 angstrome" should read --50 angstroms--;
Line 32, "bennoted" should read --be noted--; and
Line 64, "wer" should read "were".

COLUMN 26

Line 4, "a" should read --as--; and "aluminium" should read --aluminum--.

UNITED STATES PATENT AND TRADEMARK OFFICE
CERTIFICATE OF CORRECTION

PATENT NO. : 4,782,347

DATED : November 1, 1988

INVENTOR(S) : Kurematsu, et al.

It is certified that error appears in the above-identified patent and that said Letters Patent is hereby corrected as shown below:

COLUMN 27
Line 29, "is stores" should read --stores--;

COLUMN 28
Line 4, "reisitant" should read --resistant--;
Line 26, "nad" should read --and--;
Line 31, "quanity" should read --quantity--; and
Line 43, "descretely" should read --discretely--.

Signed and Sealed this

Twentieth Day of March, 1990

*Attest:*

JEFFREY M. SAMUELS

*Attesting Officer*

*Acting Commissioner of Patents and Trademarks*